(12) United States Patent
Loewenstein et al.

(10) Patent No.: US 10,223,116 B2
(45) Date of Patent: Mar. 5, 2019

(54) MEMORY SHARING ACROSS DISTRIBUTED NODES

(71) Applicant: Oracle International Corporation, Redwood Shores, CA (US)

(72) Inventors: Paul N. Loewenstein, Palo Alto, CA (US); John G. Johnson, San Jose, CA (US); Kathirgamar Aingaran, San Jose, CA (US); Zoran Radovic, Alvsjo (SE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 555 days.

(21) Appl. No.: 13/828,555

(22) Filed: Mar. 14, 2013

(65) Prior Publication Data

US 2014/0095810 A1 Apr. 3, 2014

Related U.S. Application Data

(60) Provisional application No. 61/709,142, filed on Oct. 2, 2012.

(51) Int. Cl.
*G06F 12/08* (2016.01)
*G06F 12/12* (2016.01)
(Continued)

(52) U.S. Cl.
CPC .......... *G06F 9/30065* (2013.01); *G06F 9/381* (2013.01); *G06F 9/3851* (2013.01);
(Continued)

(58) Field of Classification Search
CPC ...... G06F 3/067; G06F 3/0683; G06F 3/0646; G06F 2201/182; G06F 2201/825;
(Continued)

(56) References Cited

U.S. PATENT DOCUMENTS 5,522,045 A * 5/1996 Sandberg ............ G06F 12/1072
709/215
5,561,799 A 10/1996 Khalidi
(Continued)

FOREIGN PATENT DOCUMENTS

WO WO 02/191125 A2 3/2002
WO WO 2010/039895 A2 4/2010

OTHER PUBLICATIONS

Zeffer, H., Radovic, Z., Karlsson, M. and E. Hagerston. TMA: a trap-Based memory architecture. In ICS '06 Proceedings of the 20th annual international conference of supercomputing, pp. 259-268, Jun. 2006.*

(Continued)

*Primary Examiner* — Tracy A Warren
(74) *Attorney, Agent, or Firm* — Hickman Palermo Becker Bingham LLP

(57) ABSTRACT

A method and apparatus are disclosed for enabling nodes in a distributed system to share one or more memory portions. A home node makes a portion of its main memory available for sharing, and one or more sharer nodes mirrors that shared portion of the home node's main memory in its own main memory. To maintain memory coherency, a memory coherence protocol is implemented. Under this protocol, load and store instructions that target the mirrored memory portion of a sharer node are trapped, and store instructions that target the shared memory portion of a home node are trapped. With this protocol, valid data is obtained from the home node and updates are propagated to the home node. Thus, no "dirty" data is transferred between sharer nodes. As a result, the failure of one node will not cause the failure of another node or the failure of the entire system.

48 Claims, 6 Drawing Sheets

(51) Int. Cl.

| | |
|---|---|
| *G06F 9/30* | (2018.01) |
| *G06F 17/30* | (2006.01) |
| *G06F 9/54* | (2006.01) |
| *G06F 9/38* | (2018.01) |
| *G06F 12/0804* | (2016.01) |
| *G06F 15/173* | (2006.01) |
| *G06F 12/0817* | (2016.01) |
| *G06F 12/14* | (2006.01) |
| *G06F 21/62* | (2013.01) |
| *H04L 29/06* | (2006.01) |
| *G06F 15/78* | (2006.01) |
| *G06F 13/10* | (2006.01) |
| *G06F 13/362* | (2006.01) |
| *G06F 13/40* | (2006.01) |

(52) U.S. Cl.
CPC ............ *G06F 9/3867* (2013.01); *G06F 9/546* (2013.01); *G06F 12/082* (2013.01); *G06F 12/0804* (2013.01); *G06F 12/12* (2013.01); *G06F 12/1408* (2013.01); *G06F 12/1475* (2013.01); *G06F 13/102* (2013.01); *G06F 13/362* (2013.01); *G06F 13/4068* (2013.01); *G06F 15/17331* (2013.01); *G06F 15/7889* (2013.01); *G06F 17/30324* (2013.01); *G06F 17/30442* (2013.01); *G06F 17/30483* (2013.01); *G06F 17/30495* (2013.01); *G06F 17/30498* (2013.01); *G06F 17/30501* (2013.01); *G06F 17/30519* (2013.01); *G06F 17/30578* (2013.01); *G06F 17/30595* (2013.01); *G06F 17/30867* (2013.01); *G06F 21/6209* (2013.01); *H04L 69/14* (2013.01); *Y02D 10/14* (2018.01); *Y02D 10/151* (2018.01); *Y02D 10/45* (2018.01)

(58) Field of Classification Search
CPC .......... G06F 9/52; G06F 9/5016; G06F 9/544; G06F 15/167; G06F 15/17331; G06F 13/1663; G06F 17/30171; G06F 17/30165
USPC ..... 711/147, 148, 141; 707/634, 8, 655, 656
See application file for complete search history.

(56) References Cited

U.S. PATENT DOCUMENTS

| | | | |
|---|---|---|---|
| 5,684,977 A | 11/1997 | Van Loo | |
| 6,148,377 A | 11/2000 | Carter et al. | |
| 6,151,688 A | 11/2000 | Wipfel | |
| 6,230,240 B1 | 5/2001 | Shrader | |
| 6,292,705 B1 | 9/2001 | Wang | |
| 6,295,571 B1 | 9/2001 | Scardamalia | |
| 7,197,647 B1 | 3/2007 | Van Essen | |
| 7,383,424 B1* | 6/2008 | Olgiati et al. | 712/34 |
| 7,664,938 B1 | 2/2010 | Tripathi | |
| 8,504,791 B2 | 8/2013 | Cheriton | |
| 8,732,386 B2* | 5/2014 | O'Krafka et al. | 711/103 |
| 2004/0064653 A1 | 4/2004 | Gharachorloo | |
| 2006/0095690 A1 | 5/2006 | Craddock | |
| 2007/0260821 A1* | 11/2007 | Zeffer | G06F 12/0815 711/143 |
| 2008/0010417 A1* | 1/2008 | Zeffer | G06F 12/0808 711/144 |
| 2008/0065835 A1* | 3/2008 | Iacobovici et al. | 711/141 |
| 2009/0240664 A1 | 9/2009 | Dinker et al. | |
| 2009/0240869 A1 | 9/2009 | O'Krafka et al. | |
| 2010/0030796 A1 | 2/2010 | Netz et al. | |
| 2013/0013843 A1 | 1/2013 | Radovic et al. | |
| 2013/0036332 A1 | 2/2013 | Gove et al. | |
| 2013/0191330 A1 | 7/2013 | Aronovich | |
| 2013/0232344 A1 | 9/2013 | Johnson | |
| 2014/0115283 A1 | 4/2014 | Radovic | |
| 2015/0227414 A1 | 8/2015 | Varma | |
| 2015/0278103 A1 | 10/2015 | Radovic et al. | |

OTHER PUBLICATIONS

Radovic, Zoran, "Efficient Synchronization and Coherence for Nonuniform Communication Architectures", Department of Information Technology, Uppsala University, dated Sep. 2003, 170 pages.

Karlsson, Martin, "Cache Memory Design Trade-Offs for Current and Emerging Workloads", Department of Information Technology, Uppsala University, dated Sep. 2003, 82 pages.

Wallin, Dan, "Exploiting Data Locality in Adaptive Architectures", Department of Information Technology, Uppsala University, data Sep. 2003, 122 pages.

Grenholm et al., "Latency-hiding Optimizations of the DSZOOM Instrumentation System" Department of Information Technology, Uppsala University, dated May 2003, 23 pages.

Walin et al., "Bundling: Reducing the Overhead Multiprocessor Prefetchers" Department of Information Technology, Uppsala University, dated Aug. 2003, 12 pages.

Walin et al., "Cache Memory Behavior of Advanced PDE Solvers", Department of Information Technology, Uppsala University, dated Aug. 2003, 9 pages.

Spjuth et al., "The Elbow Cache: A Power-Efficient Alternative to Highly Associative Caches", Department of Information Technology, Uppsala University, dated Sep. 2003, 9 pages.

Zeffer, et al., "Evaluation, Implementation and Performance of Write Permission Caching in the DSZOOM System", Technical report 2004-005, Department of Information Technology, Uppsala University, dated Feb. 2004., 23 pages.

Spjuth et al., "Low-Power and Conflict Tolerant Cache Design", Technical report 2004-024, Department of Information Technology, Uppsala University, dated May 2004, 10 pages.

Selen, Thorild, "Reorganisation in the skewed-associative TLB", Technical report 2004-027, Department of Information Technology, Uppsala University, dated Sep. 2004. (Master's thesis), 68 pages.

Zeffer, Hakan, "Hardware-Software Tradeoffs in Shared-Memory Implementations", PhD thesis, Department of Information Technology, Uppsala University, dated Nov. 2005, 106 pages.

Zeffer, Hakan, "Adaptive Coherence Batching for Trap-Based Memory Architectures", Licentiate Thesis 2005-002, Department of Information Technology, Uppsala University, dated May 2005, 11 pages.

Albertsson et al., "Using Complete System Simulation for Temporal Debugging of General Purpose Operating Systems and Workloads", In Proceedings of the 8th International Symposium on Modeling, Analysis and Simulation of Computer and Telecommunication Systems (MASCOTS 2000), San Francisco, California, USA, dated Aug. 2000, 8 pages.

Albertsson et al., "Simulation-Based Temporal Debugging of Inux", In Proceedings of the 2nd Real-Time Linux Workshop, Lake Buena Vista, Florida, USA, dated Nov. 2000, 7 pages.

Albertsson, Lars, "Simulation-Based Debugging of Soft Real Time Applications", In Proceedings of the Real-Time Application Symposium, IEEE Computer Society, IEEE Computer Society Press, dated May 2001, 2 pages.

Berg et al., "SIP: Performance Tuning Through Source Code Interdependence", In Proceedings of the 8th International Euro-Par Conference (Euro-Par 2002), Paderborn, Germany, dated Aug. 2002, 10 pages.

Berg et al., StatCache: A Probabilistic Approach to Efficient and Accurate Data Locality Analysis, Technical report 2003-058, Department of Information Technology, Uppsala University, dated Nov. 2003, 8 pages.

Berg et al., "Fast Data-Locality Profiling of Native Execution", In Proceedings of ACM SIGMETRICS 2005, Banff, Canada, dated Jun. 2005, 12 pages.

Berg et al., "A Statistical Multiprocessor Cache Model", In Proceedings of the 2006 IEEE International Symposium on Performance Analysis of Systems and Software (ISPASS-2006), Austin, Texas, USA, dated Mar. 2006, 11 pages.

(56) References Cited

OTHER PUBLICATIONS

Berg et al., "Low Overhead Spatial and Temporal Data Locality Analysis", Department of Information Technology, Uppsala University, dated Nov. 2003, 30 pages.
Spjuth et al., "Skewed Caches from a Low-Powered Perspective", In Proceedings of Computing Frontiers, Ischia, Italy, dated May 2005, 9 pages.
Zeffer, Hakan, "Towards Low-Complexity Scalable Shared-Memory Architectures", Thesis Department of Information Technology, Uppsala University, dated Oct. 2006. ISBN 91-554-6647-8., 50 pages.
Lof, Henrik, "Iterative and Adaptive PDE Solvers for Shared Memory Architectures", Thesis Department of Information Technology, Uppsala University, dated Oct. 2006. SBN 91-554-6648-6, 58 pages.
Wallin, Dan, "Methods for Creating and Exploiting Data Locality", Thesis Department of Information Technology, Uppsala University, dated May 2006. ISBN 91-554-6555-2, 38 pages.
Berg, Erik, "Efficient and Flexible Characterization of Data Locality through Native Execution Sampling", Department of Information Technology, Uppsala University, dated Nov. 2005, 36 pages.
Karlsson, Martin, "Memory System Design for Chip-Multiprocessors", Thesis Department of Information Technology, Uppsala University, dated Jan. 2006. ISBN 91-554-6429-7, 34 pages.
Hagersten et al., "Simulating the Data Diffusion Machine", In Proceedings of the Parallel Architecture and Languages Europe (PARLE=EUROPAR), Springer-Verlag, dated Jun. 1993. (Best Presentation Award.), 18 pages.
Hagersten et al., "Simple COMA Node Implementations" In Proceedings of the Hawaii International Conference on System Sciences (HICSS), dated Jan. 1994. (The original Simple COMA paper.), 12 pages.
Hagersten et al., "Wildfire: A Scalable Path for SMPs", In Proceedings of the 5th International Symposium on High-Performance Computer Architecture (HPCA-5), pp. 172-181, Orlando, Florida, USA, dated Jan. 1999, 10 pages.
Hagersten et al., "Parallel Computing in the Commercial Marketplace Research and Innovation at Work", Scanning the DSM Technology in Proceedings of the IEEE, dated Mar. 1999, 12 pages.
Holmgren et al., "Performance of High-Accuracy PDE Solvers on a Self-Optimizing NUMA Architecture", UPTEC F-01-017, ISSN 1401-5757, School of Engineering, Uppsala University, Sweden, dated Feb. 2001, 9 pages.
Holmgren et al., "Performance of High-Accuracy PDE Solvers on a Self-Optimizing NUMA Architecture", In Proceedings of the 7th International Euro-Par Conference (Euro-Par 2001), Manchester, UK, dated Aug. 2001, 15 pages.
UU/IT/UPSALA Architecture Research Team. "Department of Technology, Publications", http://www.it.uu.se/research/group/uart/publications, last accessed Apr. 2, 2013, 9 pages.
UU/IT/DSZOOM Home Page. "Department of Technology, Low Latency Distributed Software-Based Shared Memory, DSZOOM", http://www.it.uu.se/research/group/uart/projects/dszoom, last accessed Apr. 2, 2013, 4 pages.
Landin et al., Race-Free Interconnection Networks and Multiprocessor Consistency, In Proceedings of the 18th International Symposium on Computer Architecture (ISCA), vol. 19, No. 3, pp. 106-115, Toronto, Canada, dated May 1991, 12 pages.
Petoumenos et al., STATSHARE: A Statistical Model for Managing Cache Sharing Via Decay, In 2006th Workshop on Modeling, Benchmarking and Simulation held in conjunction: with the 33rd Annual International Symposium on Computer Architecture, Boston, MA USA, dated Jun. 2006, 10 pages.
Zoran Radovic, "Efficient Synchronization Coherence for Nonuniform Communication" Uppsala University, dated Sep. 2003, 170 Pages.
Lof et al., "THROOM, Running POSIX Multithread Binaries on a Cluster", Technical Report 2003-026, Department of Information Technology, Uppsala University, Dated Apr. 2003, 11 pages.

Grenholm et al., "Latency-Hiding and Optimizations of the DSZOOM Instrumentation System", Technical Report 2003-029, Department of Information Technology, Uppsala University, dated May 2003, 23 pages.
Zeffer et al., "Evaluation, Implementation and Performance of Write Permission Caching in the DSZOOM System", Technical report 2004-005, Department of Information Technology, Uppsala University, Feb. 2004, 23 pages.
Zeffer, Hakan, "Hardware-Software Tradeoffs in Shared-Memory Implementations", Licentiate Thesis 2005-002, Department of Information Technology, Uppsala University, May 2005, 106 pages.
Zeffer et al., "Flexibility Implies Performance", Technical report 2005-013, Department of Information Technology, Uppsala University, dated Apr. 2005, 14 pages.
Zeffer et al., "TMA: A Trap-Based Memory Architecture", Technical report 2005-015, Department of Information Technology, Uppsala University, dated May 2005, 11 pages.
Ekstrom, Niklas, "Improving DSZOOM' s Run Time System", Master's thesis, UPTEC F03 104, ISSN 1401-5757, School of Engineering, Uppsala University, Sweden, dated Jan. 2004, 32 pages.
Radovic, Zoran, "Software Techniques for Distributed Shared Memory", Doctoral Thesis, Department of Information Technology, Uppsala University, dated Nov. 2005, 133 pages.
Grenholm, Oskar, "Simple and Efficient Instrumentation for the DSZOOM System", UPTEC F-02-096, ISSN 1401-5757, School of Engineering, Uppsala University, Sweden, dated Dec. 2002, 46 pages.
Lof et al., "THROOM—Supporting POSIX Multithread Binaries on a Cluster", In Proceedings of the 9th International Euro-Par Conference (Euro-Par 2003), Klagenfurt, Austria, dated Aug. 2003, 10 pages.
Radovic, Zoran, "DSZOOM—Low Latency Software Based Shared Memory", Technical Report 2001:03, Parallel and Scientific Computing Institute (PSCI), Sweden, Apr. 2001, 24 pages.
Radovic, Zoran, "DSZOOM—Low Latency Software Based Shared Memory", UPTEC F-00-093, ISSN 1401-5757, School of Engineering, Uppsala University, Sweden, dated Dec. 2000, 51 pages.
Radovic et al., "Implementing Low Latency Distributed Software-Based Shared Memory", In Proceedings of the Workshop on Memory Performance Issues (WMPI 2001), held in conjunction with the 28th International Symposium on Computer Architecture (ISCA28), Göteborg, Sweden, Jun. 2001.
Radovic et al., "Removing the Overhead for Software-Based Shared Memory", In Proceedings of Supercomputing 2001, Denver, Colorado, USA, dated Nov. 2001, 13 pages.
Zeffer et al., "Exploiting Spatial Locality Through Permission Caching in Software DSMs", In Proceedings of the 10th International Euro-Par Conference (Euro-Par 2004), Pisa, Italy, dated Aug. 2004, 10 pages.
Cockshott et al., "High-Performance Operations Using a Compressed Database Architecture" dated Aug. 12, 1998, 14 pages.
Li et al., "Memory Coherence in Shared Virtual Memory Systems", ACM Transactions on Computer Systems, vol. 7, No. 4, dated Nov. 1989, 39 pages.
Lenoski et al., "The Directory-Based Cache Coherence Protocol for the DASH Multiprocessor", IEEE, dated 1990, 12 pages.
Kent, Christopher A., "Cache Coherence in Distributed Systems", dated Dec. 1987, Digital Western Research Laboratory, dated 1986, 90 pages.
Hardavellas et al., "Software Cache Coherence with Memory Scaling", dated Apr. 16, 1998, 2 pages.
Agarwal et al., "An Evaluation of Directory Schemes for Cache Cohrerence", Proceedings of the 15th Annual International Symposiumn on Computer Architecture, dated May 1988, 10 pages.
Radovic, U.S. Appl. No. 14/530,354, filed Oct. 31, 2014, Office Action, dated Mar. 20, 2017.
U.S. Appl. No. 14/530,354, filed Oct. 31, 2014, Office Action, dated Sep. 19, 2016.
U.S. Appl. No. 13/828,983, filed Mar. 14, 2013. Notice of Allowance, dated Oct. 11, 2016.
Radovic, U.S. Appl. No. 14/530,354, filed Oct. 31, 2014, Interview Summary, dated Dec. 12, 2016.

(56) References Cited

OTHER PUBLICATIONS

Loewenstein, U.S. Appl. No. 13/828,983, filed Mar. 14, 2013, Notice of Allowance, dated Jan. 27, 2017.
U.S. Appl. No. 13/828,983, filed Mar. 14, 2013.
Radovic, U.S. Appl. No. 14/530,354, filed Oct. 31, 2017, Final Office Action, dated Aug. 18, 2017.
Radovic, U.S. Appl. No. 14/530,354, filed Oct. 31, 2014, Interview Summary, dated Sep. 21, 2017.
Radovic, U.S. Appl. No. 14/530,354, filed Oct. 31, 2014, Notice of Allowance, dated Oct. 6, 2017.
U.S. Appl. No. 13/828,983, filed Mar. 14, 2013, Final Office Action, dated May 16, 2016.
Zeffer et al., "Flexibility Implies Performance", Appears in Proceedings of the 20th IEEE International Parallel & Distributed Processing Symposium (IPDPS 2006), Rhodes Island, Greece, dated Apr. 2006, 14 pages.
Hagersten, Erik, "Toward Scalable Cache Only Memory Architectures", Department of Telecommunications and Computer Systems, The Royal Institute of Technology, Stockholm, Sweden, dated Oct. 1992, 274 pages.
Karlsson et al., "Timestamp-based Selective Cache Allocation", In High Performance Memory Systems, edited by H. Hadimiouglu, D. Kaeli, J. Kuskin, A. Nanda, and J. Torrellas, Springer-Verlag, 2003. Also published in Proceedings of the Workshop on Memory Performance Issues (WMPI 2001), held in conjunction with the 28th International Symposium on Computer Architecture (ISCA28).
Karlsson et al., "Exploring Processor Design Options for Java-Based Middleware", In Proceedings of the 2005 International Conference on Parallel Processing (ICPP-05), Oslo, Norway, dated Jun. 2005, 10 pages.
Berg, Erik, "Methods for Run Time Analysis of Data Locality" Department of Information Technology, Uppsala University, dated Dec. 2003, 84 pages.
Lof et al:., "THROOM—Supporting POSIX Multithreaded Binaries on a Cluster", In Proceedings of the 9th International Euro-Par Conference (Euro-Par 2003), Klagenfurt, Austria, dated Aug. 2003, 10 pages.
Magnusson et al., "Queue Locks on Cache Coherent Multiprocessors", In Proceedings of the Hawaii International Conference on System Sciences (HICSS), dated Jan. 1994. (The original Simple COMA paper.), 7 pages.
Wallin et al., "Multigrid and Gauss-Seidel Smoothers Revisited: Parallelization on Chip Multiprocessors", In Proc. 20th ACM International Conference on Supercomputing, ACM Press, dated 2006, 11 pages.
Petoumemenos et al., "Modeling Cache Sharing on Chip Multiprocessor Architectures", In Proceedings of the 2006 IEEE International Symposium of Workload Characterization: San Jose, California, USA, dated 2006, 12 pages.
Radovic, Zoran, "DZOOM—Low Latency Software Based Shared Memory", UPTEC F-00-093, ISSN 1401-5757, School of Engineering, Uppsala University, Sweden, dated Dec. 2000, 51 pages.
Radovic et al., "Implementing Low Latency Distributed Software-Based Shared Memory", In Proceedings of the Workshop on Memory Performance Issues (WMPI 2001), held in conjunction with the 28th International Symposium on Computer Architecture (ISCA28), Göteborg, Sweden, dated Jun. 2001, 12 pages.
Radovic et al., "Removing the Overhead from Software-Based Shared Memory", In Proceedings of Supercomputing 2001 (SC2001), Denver, Colorado, USA, dated Nov. 2001, 13 pages.
Radovic et al., "RH Lock: A Scalable Hierarchical Spin Lock", In Proceedings of the 2nd Annual Workshop on Memory Performance Issues (WMPI 2002), held in conjunction with the 29th International Symposium on Computer Architecture (ISCA29), Anchorage, Alaska, USA, dated May 2002, 10 pages.
Radovic et al., "Efficient Synchronization for Nonuniform Communication Architecture", In Proceedings of Supercomputing 2002 (SC2002), Baltimore, Maryland, USA, dated Nov. 2002, 13 pages.
Radovic et al., "Hierarchical Backoff Locks for Nonuniform Communication Architecture" In Proceedings of the Ninth International Symposium on High Performance Computer Architecture (HPCA-9), Anaheim, California, USA, dated Feb. 2003, 12 pages.
Singhal et al., "Gigaplane: A High Performance Bus for Large SMPs", In Proceedings of the IEEE Hot Interconnect IV, pp. 41-52, Stanford University, dated Aug. 1996, 12 pages.
Spjuth, Mathias, "Refinement and Evaluation of the Elbow Cache", UPTEC F-02-033, ISSN 1401-5757, School of Engineering, Uppsala University, Sweden, dated Apr. 2002, 12 pages.
Berg et al., "StatCache: A Probabilistic Approach to Efficient and Accurate Data Locality Analysis", In Proceedings of the 2004 IEEE International Symposium on Performance Analysis of Systems and Software (ISPASS-2004), Austin, Texas, USA, dated Mar. 2004, 26 pages.
Wallin, Dan, "Performance of a High-Accuracy PDE Solver on a Self-Optimizing NUMA Architecture", In Journal of Parallel Algorithms and Applications, vol. 17, No. 4, dated 2003, 29 pages.
Wallin et al., "Miss Penalty Reduction Using Bundled Capacity Prefectching in Multiprocessors", In Proceedings of the 17th International Parallel and Distributed Processing Symposium (IPDPS 2003), Nice, France, dated Apr. 2003, 9 pages.
Wallin et al., "Cache Memory Behavior of Advanced PDE Solvers", In Proceedings of Parallel Computing 2003 (ParCo2003), Dresden, Germany, dated Sep. 2003, 6 pages.
Wallin et al., "Bundling: Reducing the Overhead of Multiprocessor Prefetchers", Technical Report 2003-037, Department of Information Technology, Uppsala University, dated Aug. 2003, 10 pages.
Walin et al., "Vasa: A Simulator Infrastructure With Adjustable Fidelity", In Proceedings of the 17th IASTED International Conference on Parallel and Distributed Computing and Systems (PDCS 2005), Phoenix, Arizona, USA, dated 2005.
Zeffer et al., "Exploiting Spatial Store Locality Through Permission Caching in Software DSMs", In Proceedings of the 10th International Euro-Par Conference (Euro-Par 2004), Pisa, Italy, dated Aug. 2004, 10 pages.
Zeffer et al., "Exploiting Locality: A Flexible DSM Approach", In Proceedings of the 20th IEEE International Parallel & Distributed Processing Symposium (IPDPS 2006), Rhodes Island, Greece, dated Apr. 2006, 10 pages.
Zeffer et al., "A Case For Low-Complexity Multi-CMP Architectures", Technical report 2006-031, Department of Information Technology, Uppsala University, dated Jun. 2006, 14 pages.
Zeffer et al., A Trap-Based Memory Architecture, In Proceedings of the 20th ACM International Conference on Supercomputing (ICS 2006), Cairns, Queensland, Australia, dated Jun. 2006, 10 pages.
Karlsson et al., "Memory System Behavior of Java-Based Middleware" In Proceedings of the Ninth International Symposium on High Performance Computer Architecture (HPCA-9), Anaheim, California, USA, dated Feb. 2003, 12 pages.

\* cited by examiner

MEMORY SHARING ACROSS DISTRIBUTED NODES

PRIORITY CLAIM

This application claims the benefit of U.S. Provisional Application Ser. No. 61/709,142, entitled "Techniques For Accelerating Database Operations", filed on Oct. 2, 2012, the entire contents of which are incorporated herein by reference.

FIELD OF THE INVENTION

This disclosure relates generally to computing systems and more particularly to a method and apparatus for enabling memory to be shared across distributed nodes.

BACKGROUND

Many functionalities and services available over the Internet or over a corporate network are provided by one or more clusters of distributed computing nodes. For example, a database used to run a large scale business may be maintained by, and made available through, a plurality of database servers running on a plurality of distributed computing nodes that form a cluster. Using a cluster of computing nodes to provide a functionality or service may give rise to a number of advantages. For example, with a cluster, it is relatively easy to add another node to increase the capacity of the system to meet increased demand. A cluster also makes it possible to load balance among the various nodes so that if one node becomes overburdened, work can be assigned to other nodes. In addition, a cluster makes it possible to tolerate failures so that if one or more nodes fail, the functionality or service is still available. For these and other reasons, large scale and mission critical services are often provided by one or more clusters of distributed nodes.

The nodes in a cluster often need to exchange/share information with each other. This information sharing may be necessary, for example, in order for the nodes to work together to carry out one or more transactions, to load balance, to implement failure prevention and recovery, etc. Typically, nodes in a cluster share information with each other using a request-response messaging model. Unfortunately, many of the existing messaging models require a significant amount of overhead, and impose a fair amount of latency. In particular, a client thread on one node typically needs to wake up a thread on another node in order to have requests serviced. This waking up may require waiting in queues and delays from context switching. Hence, existing messaging models are inefficient and do not scale well. As a result, for large scale and even smaller scale distributed node systems, an improved information sharing mechanism is needed in order to enable the distributed nodes to exchange/share information with each other more efficiently and effectively.

DETAILED DESCRIPTION OF EMBODIMENT(S)

Overview

Figure 1:
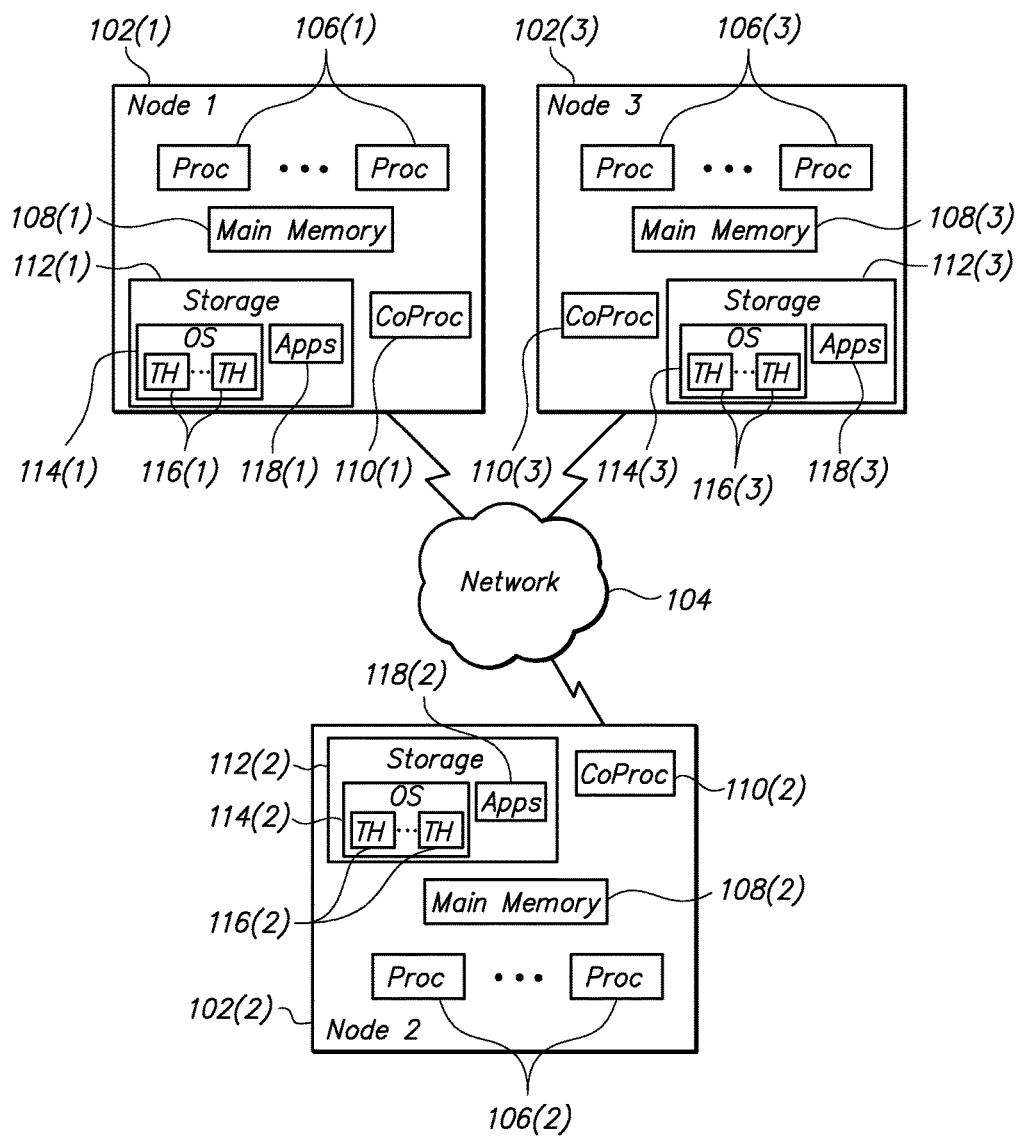
FIG. 1 is a block diagram of a sample distributed node system in which one embodiment of the present invention may be implemented.

In accordance with one embodiment of the present invention, a method and apparatus are provided for enabling nodes in a distributed node system to share one or more portions of their main memory with one or more other nodes. By sharing a portion of main memory with another node, it is meant that a node (referred to herein as the "home" node) makes a portion of its main memory available for sharing, and another node (referred to herein as the "sharer node") mirrors that portion of the home node's main memory in its own main memory. In effect, the sharer node maintains a copy of the contents of the home node's shared memory portion in a portion of its own main memory (this portion of the sharer node's main memory will be referred to herein as the mirrored portion of the sharer node's main memory). More than one sharer node may mirror the shared memory portion of the home node. With this sharing arrangement, a sharer node can access the contents of the shared memory portion of the home node by simply accessing the mirrored portion of its own main memory (assuming that the contents in the mirrored memory portion are currently valid). Thus, this arrangement enables information to be shared between the home node and the sharer node(s) with less overhead and less latency. Consequently, information sharing is made more efficient and more effective.

Since a sharer node maintains in its mirrored memory portion a copy of the contents of the shared memory portion of the home node, and since these contents may be updated by the home node or by a sharer node, there is potential for the various sets of contents to be out of synchronization. To ensure that data coherence is maintained across the distributed node system, a memory coherence protocol is implemented between the nodes. In one embodiment, the memory coherence protocol is carried out, at least in part, by trapping load and store instructions that target the mirrored memory portion of one of the sharer nodes, and by trapping store instructions that target the shared memory portion of the home node.

Sharer Node Load

In one embodiment, a sharer node may perform a load from a memory location that is within the mirrored portion of its main memory as follows. Initially, a processor in the sharer node executes a set of program instructions that pertain to a particular thread of execution. This set of program instructions may include a load instruction to load data from a particular memory location that is within the mirrored portion of the sharer node's main memory. When the processor executes the load instruction, it checks a validity indicator associated with the particular memory location to determine whether the data currently stored in the particular memory location is valid. If the validity indicator indicates valid, then the processor loads the data from the particular memory location as usual. However, if the validity indicator indicates invalid, then the processor causes the load instruction to trap, which causes the processor to suspend execution of the set of instructions pertaining to the particular thread, and to begin executing a set of trap handling instructions.

While executing the trap handling instructions, the processor causes valid data for the particular memory location to be obtained from a corresponding memory location in the shared memory portion of the home node's main memory. As part of this process, the processor may cause a directory entry, which is stored in the main memory of the home node and which is associated with the corresponding memory location in the main memory of the home node, to be accessed and locked. After the valid data is obtained from the home node, it is stored into the particular memory location of the sharer node.

In one embodiment, the sharer node may maintain a store buffer. This store buffer (which will be elaborated upon in a later section) may contain updated data that is intended to be stored into the corresponding memory location in the main memory of the home node but which has not been propagated yet to the home node. If the store buffer contains such updated data for the corresponding memory location, then the processor stores the updated data into the particular memory location (note: the updated data remains in the store buffer so that it will eventually be propagated to the home node). As a result, the data in the particular memory location will reflect both the valid data obtained from the home node and the updated data from the store buffer.

In addition, the processor sets the validity indicator associated with the particular memory location to valid to indicate that the data in the particular memory location is now valid. Further, the processor may cause the directory entry associated with the corresponding memory location in the main memory of the home node to be updated to indicate that the sharer node is now a valid sharer of the corresponding memory location. Furthermore, the processor may cause the directory entry to be unlocked.

Thereafter, the processor terminates execution of the trap handling instructions, and resumes execution of the set of program instructions pertaining to the particular thread of execution. In one embodiment, the processor resumes execution by re-executing the load instruction that targets the particular memory location. This time, because the validity indicator associated with the particular memory location is set to valid, the load operation should result in data being loaded from the particular memory location.

Sharer Node Store

In one embodiment, a sharer node may perform a store to a memory location that is within the mirrored portion of its main memory as follows. Initially, a processor in the sharer node executes a set of program instructions that pertain to a particular thread of execution. This set of program instructions may include a store instruction to store updated data to a particular memory location that is within the mirrored portion of the sharer node's main memory. When the processor executes the store instruction, it determines whether the particular memory location is a writable location. In one embodiment, during initialization, all memory locations within the mirrored portion of the sharer node's main memory are set to read-only. Thus, this determination will result in a negative, which will cause the store instruction to trap. This in turn causes the processor to suspend execution of the set of instructions pertaining to the particular thread, and to begin executing a set of trap handling instructions.

While executing the trap handling instructions, the processor stores the updated data into a store buffer on the sharer node. This updated data will at some point (barring failure of the sharer node) be retrieved from the store buffer and propagated to the home node to be stored into a corresponding memory location in the shared portion of the home node's main memory that corresponds to the particular memory location in the mirrored portion of the sharer node's main memory. In effect, storing the updated data into the store buffer causes the updated data to eventually be propagated to the home node. In one embodiment, if the store buffer already contains an existing set of updated data that is destined for the corresponding memory location of the home node's main memory, the processor merges the new updated data with the existing updated data to give rise to a set of merged updated data.

In addition to storing the updated data into the store buffer, the processor may also store the updated data into the particular memory location in the mirrored portion of the sharer node's main memory. In one embodiment, to do so, the processor determines whether the validity indicator associated with the particular memory location indicates that the data currently stored in the particular memory location is valid. If the validity indicator indicates valid, then the processor stores the updated data into the particular memory location. Otherwise, the updated data is not stored into the particular memory location.

Thereafter, the processor terminates execution of the trap handling instructions, and resumes execution of the set of program instructions pertaining to the particular thread of execution. In one embodiment, the processor resumes execution at the instruction after the store instruction. Since the updated data has already been stored (if it is stored at all) into the particular memory location, there is no need to re-execute the store instruction. In fact, executing the store instruction again may not be desirable since it may result in a trap again. Note: if the processor has the ability to execute the store instruction and ignore the read-only attribute, then the store instruction can be re-executed.

At some point, a processor on the sharer node, executing a set of instructions pertaining to a thread of execution, will retrieve the updated data from the store buffer and propagate it to the home node. This processor may be the same or different processor than the one that stored the updated data into the store buffer. This thread of execution may be the same or different thread than the one that contained the store instruction to store updated data into the particular memory location.

While executing the instructions from this thread of execution, the processor may encounter a set of update propagation instructions. While executing the set of update propagation instructions, the processor may operate as follows. Initially, the processor retrieves the updated data (or merged updated data) from an entry in the store buffer. In one embodiment, there is information stored in this entry that indicates that this updated data is destined for the corresponding memory location in the shared memory portion of the home node's main memory. To propagate the updated data to the home node, the processor may cause a directory entry, which is stored in the main memory of the home node and which is associated with the corresponding memory location in the main memory of the home node, to be locked. The processor may also cause a copy of the contents of the directory entry to be obtained from the home node.

In one embodiment, the directory entry contains information indicating which sharer nodes are currently valid sharers of the corresponding memory location. The currently valid sharers may include the current sharer node (i.e. the sharer node that is trying to propagate the updated data to the home node), and one or more other sharer nodes. Each of the other sharer nodes has a mirrored memory location in its main memory that corresponds to the corresponding memory location in the shared memory portion of the home node. In one embodiment, because the data in the corresponding memory location in the home node's main memory is to be updated, the processor causes the data in the mirrored memory location of each of the other sharer nodes to be invalidated (e.g. by causing the validity indicator associated with each of the mirrored memory locations to be set to invalid). Doing so prevents the other sharer nodes from using invalid data. The processor may also cause the copy of the contents of the directory entry to be updated to no longer indicate that the other sharer nodes are valid sharers of the corresponding memory location in the home node's main memory.

In addition, the processor causes the updated data to be propagated to the home node and stored into the corresponding memory location in the shared memory portion of the home node's main memory. Furthermore, the processor may cause the updated contents of the directory entry to be stored into the directory entry on the home node, and cause the directory entry to be unlocked. Yet further, the processor removes the updated data from the store buffer. Propagation of the updated data to the home node is thus completed.

Home Node Load and Store

In one embodiment, a home node may perform a load from a memory location that is within the shared memory portion of its main memory in the same manner as it would a load from any other memory location. It is assumed, in one embodiment, that data in the shared memory portion of the home node's main memory is always valid; thus, there is no need to trap this load instruction or to provide any special handling.

In one embodiment, a home node may perform a store to a memory location that is within the shared memory portion of its main memory as follows. Initially, a processor on the home node executes a set of program instructions that pertain to a particular thread of execution. This set of program instructions may include a store instruction to store updated data to a particular memory location that is within the shared portion of the home node's main memory. When the processor executes the store instruction, it determines whether the particular memory location is a writable location. In one embodiment, during initialization, all memory locations within the shared portion of the home node's main memory are set to read-only. Thus, this determination will result in a negative, which will cause the store instruction to trap. This in turn causes the processor to suspend execution of the set of instructions pertaining to the particular thread, and to begin executing a set of trap handling instructions.

While executing the trap handling instructions, the processor may access and lock a directory entry that is stored in the main memory of the home node and that is associated with the particular memory location. In one embodiment, the directory entry contains information indicating which sharer nodes are currently valid sharers of the particular memory location. Each of the sharer nodes has a mirrored memory location in its main memory that corresponds to the particular memory location in the shared portion of the home node's main memory. In one embodiment, because the data in the particular memory location is to be updated, the processor causes the data in the mirrored memory location of each of the sharer nodes to be invalidated (e.g. by causing the validity indicator associated with each of the mirrored memory locations to be set to invalid). This prevents the sharer nodes from using invalid data. The processor may also update the directory entry so that the directory entry no longer indicates the sharer nodes as being valid sharers of the particular memory location.

In addition, the processor stores the updated data into the particular memory location. Furthermore, the processor may unlock the directory entry. Thereafter, the processor terminates execution of the trap handling instructions, and resumes execution of the set of program instructions pertaining to the particular thread of execution at the instruction after the store instruction. Since the updated data has already been stored into the particular memory location, there is no need to re-execute the store instruction.

Failure Containment

The memory coherence protocol set forth above ensures that memory coherence is maintained across all of the nodes in a distributed node system. This memory coherence protocol has an additional desirable property that a node failure is contained to that node. That is, the failure of one node will not cause another node or the overall system to fail. Notice from the above overview that valid data is obtained from the home node and updates are propagated to the home node. No "dirty" data (modified data that has not been propagated to the home node) is transferred from sharer node to sharer node. Because of this, if a node fails, all that is lost is: the data for which that node is the home node; and any updates made by that node that have not yet been propagated to a home node. Updates made by other nodes are not lost. Hence, the failure of one node will not cause the failure of another node or the failure of the entire system. This failure containment property (as well as other properties) of the above memory coherence protocol makes it a desirable protocol to implement in distributed node systems that provide mission critical or other important functionalities and services.

Sample System

With reference to FIG. 1, there is shown a block diagram of a sample distributed node system 100 in which one embodiment of the present invention may be implemented. As shown, system 100 comprises node 1 102(1), node 2 102(2), and node 3 102(3). It should be noted that three nodes are shown for illustrative purposes only. For purposes of the present invention, system 100 may have any desired number of nodes. For referencing purposes, similar elements will be referenced using the same reference number. For example, the reference number 102 is used for each of the nodes. This reference number will be used when referring to a node generally. When it is desired to refer to a specific node, then an additional index will be used. For example, when referring to node 2, the reference number 102(2) will be used. This convention will be used for the other elements as well.

In one embodiment, the various nodes 102 may be geographically distributed. Thus, to enable the nodes 102 to communicate with each other, a network 104 may be provided. For purposes of the present invention, the network 104 may be any type of mechanism that enables communication to be conducted between the nodes 102, including but not limited to a simple wired interconnect, a switched fabric, a packet switched network, an Ethernet network, an IP network, a LAN, a WAN, the Internet, a wireless network, etc.

Each node 102 may comprise one or more processors 106, a main memory 108, and a storage 112. The storage 112, which may, for example, be a persistent storage such as a hard drive, a flash memory, etc., may store an operating system 114 and one or more applications 118. The operating system 114 may include one or more sets of trap handling instructions 116. These trap handling instructions 116 may include the load and store trap handling instructions (which will be discussed further in a later section) that are executed to implement a portion of the memory coherence protocol described herein. The one or more applications 118 may include update propagation instructions (which will also be discussed further in a later section) that are executed to cause updated data to be propagated from a store buffer of a sharer node to a home node. In one embodiment, the update propagation instructions help to implement the other portion of the memory coherence protocol. The update propagation instructions may be part of an application programming interface (API) that is invoked by the one or more applications 118 to propagate data updates to a home node. If so desired, the update propagation instructions may be incorporated into the operating system 114 in addition to, or in lieu of, being in the one or more applications 118 or API. During operation, the operating system 114 and applications 118 may be loaded into main memory 108. While in main memory 108, the instructions in the operating system 114 and the applications 118 may be executed by the one or more processors 106 to implement the memory coherence protocol described herein, as well as to provide other functionalities. In one embodiment, each node 102 may be a symmetric multiprocessing computing (SMP) node that is capable of supporting multi-threaded processing.

In one embodiment, each processor 106 comprises circuitry for determining whether a load or store instruction should trap. Specifically, each processor 106 comprises circuitry for determining, when performing a load from a memory location in the main memory 108, whether a validity indicator associated with that memory location indicates valid or invalid. If the validity indicator indicates invalid, the circuitry causes the load instruction to trap. Also, each processor 106 comprises circuitry for determining, when performing a store to a memory location in the main memory 108, whether that memory location is writable. If the memory location is not writable (e.g. read-only), the circuitry causes the store instruction to trap. If a load or store instruction traps, the processor 106 executing the load or store instruction suspends execution of a current set of instructions (pertaining to a particular thread of execution), and begins executing an appropriate set of trap handling instructions 116. After the trap is handled, the processor 106 resumes execution of the instructions pertaining to the particular thread of execution. In one embodiment, the instruction trapping functionality of the processors 106 is exploited to facilitate memory sharing between the nodes 102 and to facilitate implementation of the data coherence protocol described herein.

The main memory 108 of a node 102 comprises a plurality of memory locations. For purposes of the present invention, a memory location may be of any desired size. For example, a memory location may be as small as a single data word or as large as a page or larger. A memory location may be accessed using a physical address. This physical address may be mapped to one or more virtual addresses by way of an address translation table. If set large enough, a memory location may contain enough data to span multiple virtual addresses. In such a case, several virtual addresses may map to the same physical address (i.e. the same memory location), with the different virtual addresses mapping to different offsets within the memory location. In one embodiment, a memory location has more capacity than is required for storing data. That is, a memory location may have more bits than are needed to store data. The additional bit or bits may be used to store a validity indicator associated with the memory location. Thus, in one embodiment, the validity indicator associated with a memory location is stored within the memory location itself. However, this is not required. If so desired, the validity indicator associated with a memory location may be stored elsewhere. As noted above, in one embodiment, this validity indicator may be used to determine whether to trap a load instruction, and whether to store a set of updated data into a memory location.

In addition to the elements already described, each node 102 may further comprise a hardware coprocessor 110. In one embodiment, the coprocessors 110 on the various nodes 102 interact with each other across the network 104 to facilitate the sharing of memory between the nodes 102 and to facilitate the implementation of the memory coherence protocol described herein. Given the coprocessors 110, it is not necessary for the processors 106 on the nodes 102 to execute dedicated threads to perform the tasks needed to implement memory sharing. Hence, the coprocessors 110 free up processor resources.

For purposes of the present invention, a coprocessor 110 may take on any desired form. For example, a coprocessor 110 may be a set of hardware elements, including logic elements, that are hardwired to provide a certain set of functionalities. Alternatively, a coprocessor 110 may be a device (e.g. an ASIC, an FPGA, etc.) having elements, including logic elements, that are configured to provide a certain set of functionalities. As a further alternative, a coprocessor may have a processing core that enables it to execute instructions to give rise to one or more functionalities. These and other forms are within the scope of the present invention. In the above discussion, a coprocessor 110 is described as being a hardware component. It should be noted, though, that this is not required. If so desired, the functionalities of the coprocessor 110 may be realized by having one or more of the processors 106 execute instructions that give rise to the functionalities. While this is not as efficient an implementation as the hardware implementation, it is a possible one. All such implementations are within the scope of the present invention. In a particular embodiment used as an example in later sections, the coprocessor 110 takes the form of a hardware coprocessor that responds to instructions or commands received from the processors 106. The operation of the coprocessors 110 in accordance with one embodiment of the present invention, including the manner in which the coprocessors 110 interact with the processors 106 and with each other, will be described in a later section.

In system 100, a node 102 may make a portion of its main memory 108 available for sharing with other nodes 102. When a node 102 makes a portion of its main memory 108 available for sharing, it is acting as the home node for that memory portion. If another node 102 wishes to share that memory portion with the home node, that other node 102 mirrors that memory portion in its own main memory 108. In such a case, the other node 102 acts as a sharer node for that memory portion. In one embodiment, a node 102 may make a portion of its main memory 108 available for sharing, and may mirror a portion of main memory 108 made available for sharing by another node 102. Thus, a node 102 may act as both a home node (for the memory portion that it is making available for sharing) and a sharer node (for the memory portion that it is mirroring from another node). An example of this is shown in FIG. 2.

Figure 2:
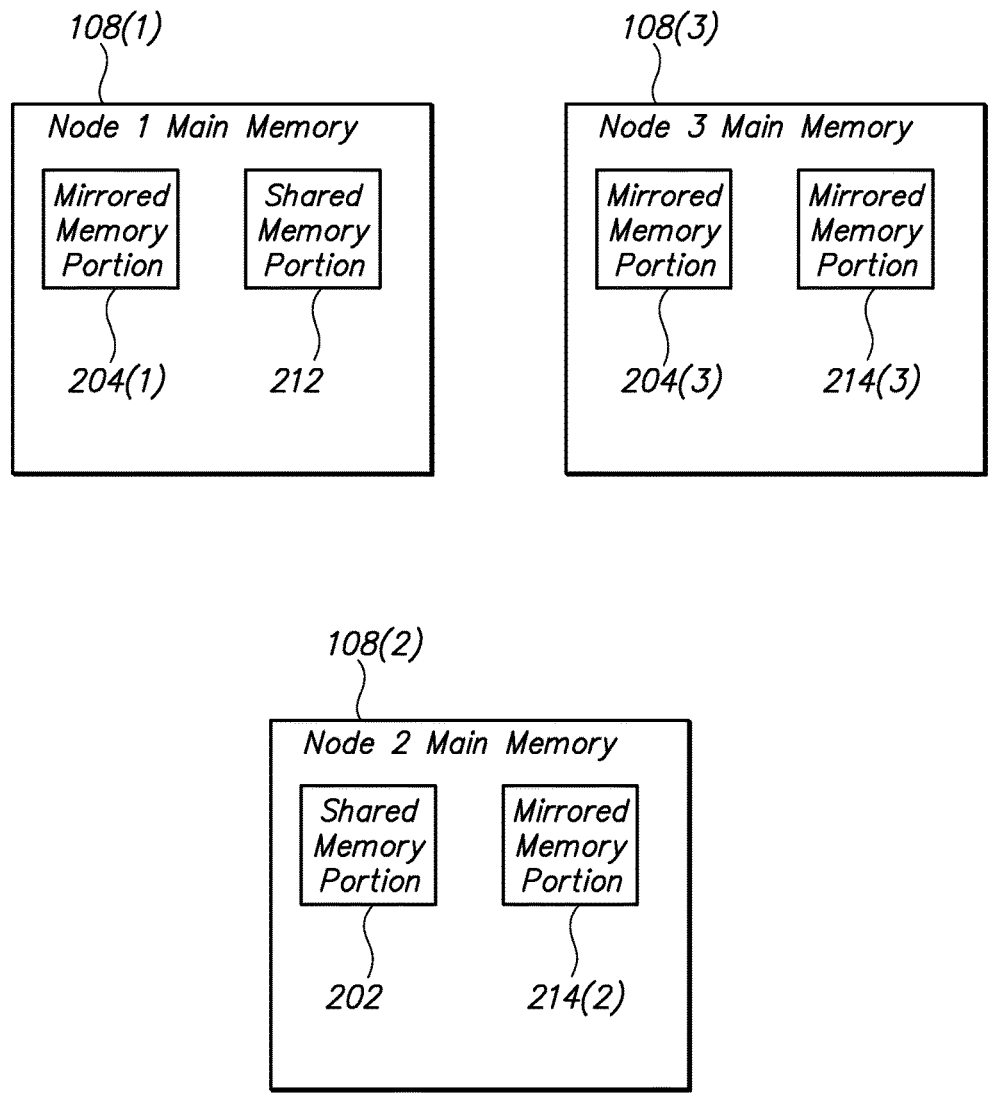
FIG. 2 illustrates an example in which some nodes act as both a home node and a sharer node, in accordance with one embodiment of the present invention.

In FIG. 2, node 2 102(2) is making portion 202 of its main memory 108(2) available for sharing with the other nodes. This shared memory portion 202 is mirrored by nodes 1 and 3; thus, node 1 102(1) has a mirrored memory portion 204(1) in its main memory 108(1) that mirrors shared memory portion 202, and node 3 102(3) has a mirrored memory portion 204(3) in its main memory 108(3) that mirrors shared memory portion 202. In this arrangement, node 2 102(2) is acting as the home node for shared memory portion 202 and nodes 1 and 3 are acting as sharer nodes for shared memory portion 202.

In addition, node 1 102(1) is making portion 212 of its main memory 108(1) available for sharing with the other nodes. This shared memory portion 212 is mirrored by nodes 2 and 3; thus, node 2 102(2) has a mirrored memory portion 214(2) in its main memory 108(2) that mirrors shared memory portion 212, and node 3 102(3) has a mirrored memory portion 214(3) in its main memory 108(3) that mirrors shared memory portion 212. In this arrangement, node 1 102(1) is acting as the home node for shared memory portion 212 and nodes 2 and 3 are acting as sharer nodes for shared memory portion 212. Thus, as this example shows, a node 102 may act as both a home node and a sharer node. For purposes of the present invention, a node 102 may act as a home node for any number (zero or more) of memory portions, and may act as a sharer node for any number (zero or more) of memory portions.

Sample Operation

With the above overview and system description in mind, a sample operation of the system, in accordance with one embodiment of the present invention, will now be described.
Initialization In order to prepare the various nodes 102 in system 100 to share memory, the nodes 102 are initialized. In one embodiment, the nodes 102 may be initialized in the manner described below. A node 102 may act as a home node for one or more memory portions, and/or a sharer node for one or more memory portions, or not participate in memory sharing at all. Depending on what a node 102 decides to do, it may perform some, all, or none of the following operations.
Home Node During initialization, software (e.g. the operating system 114, one or more of the applications 118, etc.) is executed by one or more of the processors 106 on a node 102. Under control of the software, the node 102 determines whether it wishes to make any portion of its main memory 108 available for sharing. If it does, it will act as the home node for that shared memory portion.

In making a portion of its main memory 108 available for sharing, a home node 102 determines a range of virtual addresses that it wishes to share (these virtual addresses will be referred to herein as the shared virtual addresses). The node 102 then allocates sufficient physical memory in its main memory 108 to store data for the entire shared virtual address range. This allocated physical memory will serve as the memory portion of the home node's main memory 108 that the home node 102 is willing to share with other nodes (this memory portion will be referred to herein as the shared memory portion). The shared memory portion comprises a plurality of memory locations. As noted previously, the memory locations may have any desired size. Each memory location has an associated physical address. The shared virtual addresses are mapped to the physical addresses of the memory locations in the shared memory portion, and this mapping is stored in an address translation table. If the memory locations are large enough to contain data for multiple shared virtual addresses, then multiple shared virtual addresses may be mapped to the same physical address with different offsets. For the sake of simplicity, offsets will not be further mentioned below. Each shared virtual address will simply be considered to be mapped to a physical address with the understanding that such mapping may involve the use of an offset.

In one embodiment, each entry in the address translation table corresponding to one of the shared virtual addresses is marked as read-only. This will cause all store instructions that target memory locations mapped to the shared virtual addresses to trap. In addition, the validity indicators associated with all of the memory locations in the shared memory portion are set to valid (recall that, in one embodiment, each memory location has an associated validity indicator, and each validity indicator associated with a memory location is stored within that memory location). Setting these validity indicators to valid will cause all load instructions that target memory locations within the shared memory portion to not trap.

In addition, the home node 102 allocates physical memory in its main memory 108 for storing a directory structure. This directory structure comprises a directory entry for each one of the memory locations in the shared memory portion. Put another way, each one of the memory locations in the shared memory portion has an associated directory entry in the directory structure. The physical memory allocated for the directory structure comprises one or more memory locations, and each memory location has a physical address. These memory locations are used to store the directory entries; thus, each of the directory entries is mapped to the physical address of one of these memory locations. If a memory location is large enough to store multiple directory entries, then multiple directory entries may be mapped to the same physical address with different offsets. For the sake of simplicity, offsets will not be further mentioned below. Each directory entry will simply be considered to be mapped to a physical address with the understanding that such mapping may involve the use of an offset.

In one embodiment, the directory entry associated with a memory location in the shared memory portion comprises sharing and locking information for that memory location. Specifically, the directory entry has information indicating which node/nodes 102 (if any) is/are currently a valid sharer of that memory location in the shared memory portion. As will be discussed further in a later section, this information is used in maintaining memory coherence across the nodes 102. Also, the directory entry indicates whether the directory entry is currently locked. In one embodiment, data may be loaded from or stored to a memory location in the shared memory portion only if the directory entry associated with that memory location is locked. This helps to maintain data integrity. During initialization, each directory entry is initialized to indicate that it is not locked and that there are currently no valid sharers of the memory location in the shared memory portion associated with that directory entry.

Furthermore, the node 102 creates an index structure for all of the shared virtual addresses. This index structure enables information pertaining to the shared virtual addresses to be accessed quickly and easily. In one embodiment, for each of the shared virtual addresses that a home node 102 is making available for sharing, the index structure includes information indicating the physical address of the memory location in the home node's main memory 108 where the directory entry associated with that shared virtual address is stored (note: each directory entry is associated with a memory location in the shared memory portion and each shared virtual address maps to one of the memory locations in the shared memory portion; thus, each shared virtual address is associated with one of the directory entries). Additional information may be added to this index structure at a later time, as will be described below.

After the above operations are performed, the home node 102 broadcasts information to inform the other nodes 102 of its willingness to share a portion of its main memory. As part of this broadcast, the home node 102 may provide its node identifier and the address range of the shared virtual addresses. In addition, it may provide, for each of the shared virtual addresses: (a) the physical address of the memory location in the shared memory portion of the home node's main memory 108 to which the shared virtual address is mapped; and (b) the physical address of the memory location in the home node's main memory 108 where the directory entry associated with the shared virtual address is stored. This information will be used by one or more sharer nodes 102 to mirror the shared memory portion of the home node's main memory 108 in its own main memory.

Sharer Node

During initialization, under software control, a node 102 may receive information broadcasted by a home node indicating a willingness to share a portion of the home node's main memory. In response to this information, the node 102 may decide to share or not share that portion of the home node's main memory. If the node 102 decides to share that portion of the home node's main memory, then it will act as a sharer node for that shared memory portion.

To share the shared memory portion of the home node's main memory, a sharer node 102 takes note of the address range of the shared virtual addresses broadcasted by the home node. The sharer node 102 may choose to use the same virtual addresses as the shared virtual addresses, or use a different set of virtual addresses that map to the shared virtual addresses. In the following discussion, for the sake of example, it will be assumed that the sharer node 102 uses the same virtual addresses as the shared virtual addresses broadcasted by the home node.

The sharer node 102 allocates sufficient physical memory in its main memory 108 to store data for the entire shared virtual address range. This allocated physical memory will serve as the memory portion of the sharer node's main memory 108 that is used to mirror the shared memory portion of the home node's main memory (this memory portion of the sharer node's main memory will be referred to herein as the mirrored memory portion). The mirrored memory portion comprises a plurality of memory locations. In one embodiment, these memory locations are the same size as the memory locations in the shared memory portion of the home node's main memory. Each memory location has an associated physical address. The shared virtual addresses are mapped to the physical addresses of the memory locations in the mirrored memory portion, and this mapping is stored in an address translation table. If the memory locations are large enough to contain data for multiple shared virtual addresses, then multiple shared virtual addresses may be mapped to the same physical address with different offsets. For the sake of simplicity, offsets will not be further mentioned below. Each shared virtual address will simply be considered to be mapped to a physical address with the understanding that such mapping may involve the use of an offset.

In one embodiment, each entry in the address translation table corresponding to one of the shared virtual addresses is marked as read-only. This will cause all store instructions that target memory locations mapped to the shared virtual addresses to trap. In addition, the validity indicators associated with all of the memory locations in the mirrored memory portion are set to invalid. Setting these validity indicators to invalid will cause all load instructions targeting the memory locations in the mirrored memory portion to initially trap.

In one embodiment, the sharer node 102 also allocates some physical memory in its main memory 108 for a store buffer. As will be discussed further in a later section, this store buffer is used to store data updates that are intended to be stored into memory locations in the shared memory portion of the home node but which have not been propagated to the home node yet.

In addition, the sharer node 102 creates an index structure for all of the shared virtual addresses. This index structure enables information pertaining to the shared virtual addresses to be accessed quickly and easily. In one embodiment, for each of the shared virtual addresses, the index structure includes: (a) an indication of which node is the home node for that shared virtual address; (b) the physical address of the memory location in the shared memory portion of the home node's main memory to which the shared virtual address is mapped; and (c) the physical address of the memory location in the home node's main memory where the directory entry associated with the shared virtual address is stored. All of this information was previously broadcasted by the home node. Additional information may be added to this index structures at a later time, as will be described below.

Furthermore, the sharer node 102 broadcasts information to the other nodes to inform the other nodes that it is now sharing the shared memory portion of the home node's main memory. As part of this broadcast, the sharer node 102 may provide its node identifier. In addition, the sharer node 102 may provide, for each of the shared virtual addresses that it is sharing with the home node, the physical address of the memory location in the sharer node's mirrored memory portion to which the shared virtual address is mapped. This information will be used by the home node and other sharer nodes to update the index structure for the shared virtual addresses, as will be described below.

Home Node and Sharer Node

Under software control, a node 102, whether it is acting as a home node or a sharer node, listens to information broadcasted by another node indicating that the other node is sharing certain virtual addresses with a home node. Using this information, the node 102 updates the index structure that it previously created for the shared virtual addresses.

For example, suppose that a home node has made a shared virtual address SVA1 available for sharing. Suppose a sharer node broadcasts that it is sharing this virtual address. Included in this broadcast are the node identifier of the sharer node and the physical address of the memory location in the mirrored memory portion of the sharer node's main memory to which the shared virtual address is mapped. With this information, the home node now knows that the sharer node is sharing SVA1, and the home node also knows the physical address of the memory location in the sharer node's mirrored memory portion where data for SVA1 is stored. The home node updates its index structure for the shared virtual addresses with this information for SVA1.

Similarly, suppose that a sharer node is sharing a shared virtual address SVA1 made available for sharing by a home node. Suppose further that another sharer node broadcasts that it is also sharing this virtual address. Included in this broadcast are the node identifier of the other sharer node and the physical address of the memory location in the mirrored memory portion of the other sharer node's main memory to which the shared virtual address is mapped. With this information, the first sharer node now knows that the other sharer node is also sharing SVA1, and the first sharer node also knows the physical address of the memory location in the other sharer node's mirrored memory portion where data for SVA1 is stored. The first sharer node updates its index structure for the shared virtual addresses with this information for SVA1.

Example

Figure 3:
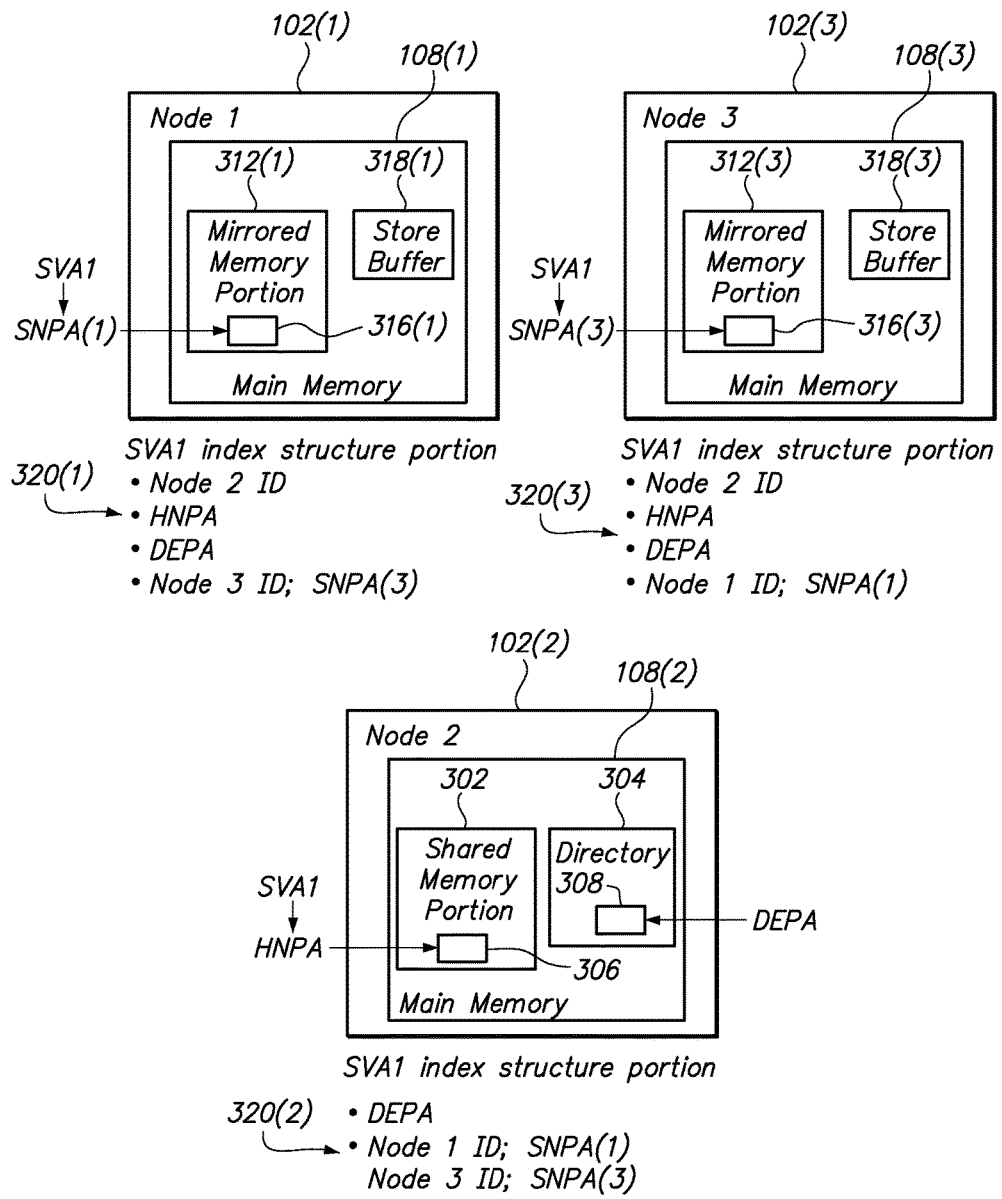
FIG. 3 illustrates an example of the memory structures and index structures that may be created during an initialization process, in accordance with one embodiment of the present invention.

To illustrate a sample result of the initialization process, reference will now be made to the example shown in FIG. 3. In FIG. 3, node 2 102(2) acts as a home node and nodes 1 and 3 102(1), 102(3) act as sharer nodes. Acting as the home node, node 2 102(2) makes a shared memory portion 302 of its main memory 108(2) available for sharing. Node 2 102(2) also has a directory structure 304 in its main memory 108(2) that contains a directory entry for each of the memory locations in the shared memory portion 302. Acting as a sharer node, node 1 102(1) has a mirrored memory portion 312(1) in its main memory 108(1) that mirrors the shared memory portion 302 of node 2 102(2). Node 1 102(1) also has a store buffer 318(1) in its main memory 108(1) for storing updated data that is intended to be stored in memory locations in the shared memory portion 302 of node 2 102(2) but which have not been propagated yet to node 2 102(1). Similarly, acting as a sharer node, node 3 102(3) has a mirrored memory portion 312(3) in its main memory 108(3) that mirrors the shared memory portion 302 of node 2 102(2). Node 3 102(3) also has a store buffer 318(3) in its main memory 108(3) for storing updated data that is intended to be stored in memory locations in the shared memory portion 302 of node 2 102(2) but which have not been propagated yet to node 2 102(1).

The shared memory portion 302 of node 2 102(2) includes a memory location 306. This memory location 306 has a physical address HNPA, which maps to shared virtual address SVA1. This memory location 306 has an associated directory entry 308 in the directory structure 304. This directory entry 308 has a physical address DEPA.

The memory location 306 has a corresponding memory location 316(1) in the mirrored memory portion 312(1) of sharer node 1 102(1). The corresponding memory location 316(1) has a physical address SNPA(1), and this physical address SNPA(1) also maps to shared virtual address SVA1. Thus, in this example, shared virtual address SVA1 is common to both memory locations 306 and 316(1). Memory location 306 also has a corresponding memory location 316(3) in the mirrored memory portion 312(3) of sharer node 3 102(3). The corresponding memory location 316(3) has a physical address SNPA(3) 102(3), and this physical address SNPA(3) maps to shared virtual address SVA1. Thus, in this example, shared virtual address SVA1 is again common to both memory locations 306 and 316(3).

As noted previously, each node 102 creates an index structure for all of the shared virtual addresses. FIG. 3 shows the portions of the index structures that might be created by the various nodes 102 for shared virtual address SVA1. Similar index structure portions may be created for each of the other shared virtual addresses. For home node 2 102(2), the index structure portion 320(2) for SVA1 may include the physical address DEPA of the directory entry 308 that is associated with the memory location 306 to which SVA1 is mapped. The index structure portion 302(2) may also include information on the nodes that are sharing SVA1. Since node 1 102(1) and node 3 102(3) are sharing SVA1 in the current example, the index structure portion 302(2) may include the node identifier of node 1 102(1), and the physical address SNPA(1) of the memory location 316(1) on node 1 102(1) to which SVA1 is mapped. The index structure portion 302(2) may also include the node identifier of node 3 102(3), and the physical address SNPA(3) of the memory location 316(3) on node 3 102(3) to which SVA1 is mapped. This information was broadcasted by node 1 102(1) and node 3 102(3) when they decided to share the shared memory portion 302 of node 2 102(2).

For sharer node 1 102(1), the index structure portion 320(1) for SVA1 may include information pertaining to the home node 102(2). This information may include the node identifier of node 2 102(2) to indicate that node 2 is the home node for SVA1. This information may also include the physical address HNPA of the memory location 306 on the home node 2 102(2) to which SVA1 is mapped. This information may further include the physical address DEPA of the directory entry 308 on the home node 2 102(2) that is associated with the memory location 306 to which SVA1 is mapped. All of this information was broadcasted by the home node 2 102(2) when it decided to make the shared memory portion 302 available for sharing. In addition, the index structure portion 320(1) for SVA1 may include information about other sharing nodes. Since node 3 102(3) is also sharing SVA1, index structure portion 302(1) may include the node identifier of node 3 102(3), and the physical address SNPA(3) of the memory location 316(3) on node 3 102(3) to which SVA1 is mapped. This information was broadcasted by node 3 102(3) when it decided to share the shared memory portion 302 of node 2 102(2).

To complete the example, for sharer node 3 102(3), the index structure portion 320(3) for SVA1 may include information pertaining to the home node 102(2). This information may include the node identifier of node 2 102(2) to indicate that node 2 is the home node for SVA1. This information may also include the physical address HNPA of the memory location 306 on the home node 2 102(2) to which SVA1 is mapped. This information may further include the physical address DEPA of the directory entry 308 on the home node 2 102(2) that is associated with the memory location 306 to which SVA1 is mapped. All of this information was broadcasted by the home node 2 102(2) when it decided to make the shared memory portion 302 available for sharing. In addition, the index structure portion 320(3) for SVA1 may include information about other sharing nodes. Since node 1 102(1) is also sharing SVA1, index structure portion 302(3) may include the node identifier of node 1 102(1), and the physical address SNPA(1) of the memory location 316(1) on node 1 102(1) to which SVA1 is mapped. This information was broadcasted by node 1 102(1) when it decided to share the shared memory portion 302 of node 2 102(2).

Regular Operation

The above discussion describes how nodes 102 in system 100 may be initialized, in accordance with one embodiment of the present invention. After the nodes 102 are initialized, they are ready to implement the memory sharing and memory coherence protocol described below. In the following description, operation will be described separately for a sharer node and a home node. The operations performed by a node will depend on whether that node is acting as a home node or a sharer node when it is performing a load or a store operation on a memory location. To provide some context for discussion, reference will be made below to the system diagram shown in FIG. 1 and the example shown in FIG. 3. For purposes of the following discussion, it will be assumed that node 1 102(1) is the sharer node on which load and store operations are performed, and that node 2 102(2) is the home node. Node 3 102(3) will be assumed to be an additional sharer node.

Sharer Node Load

Figure 4:
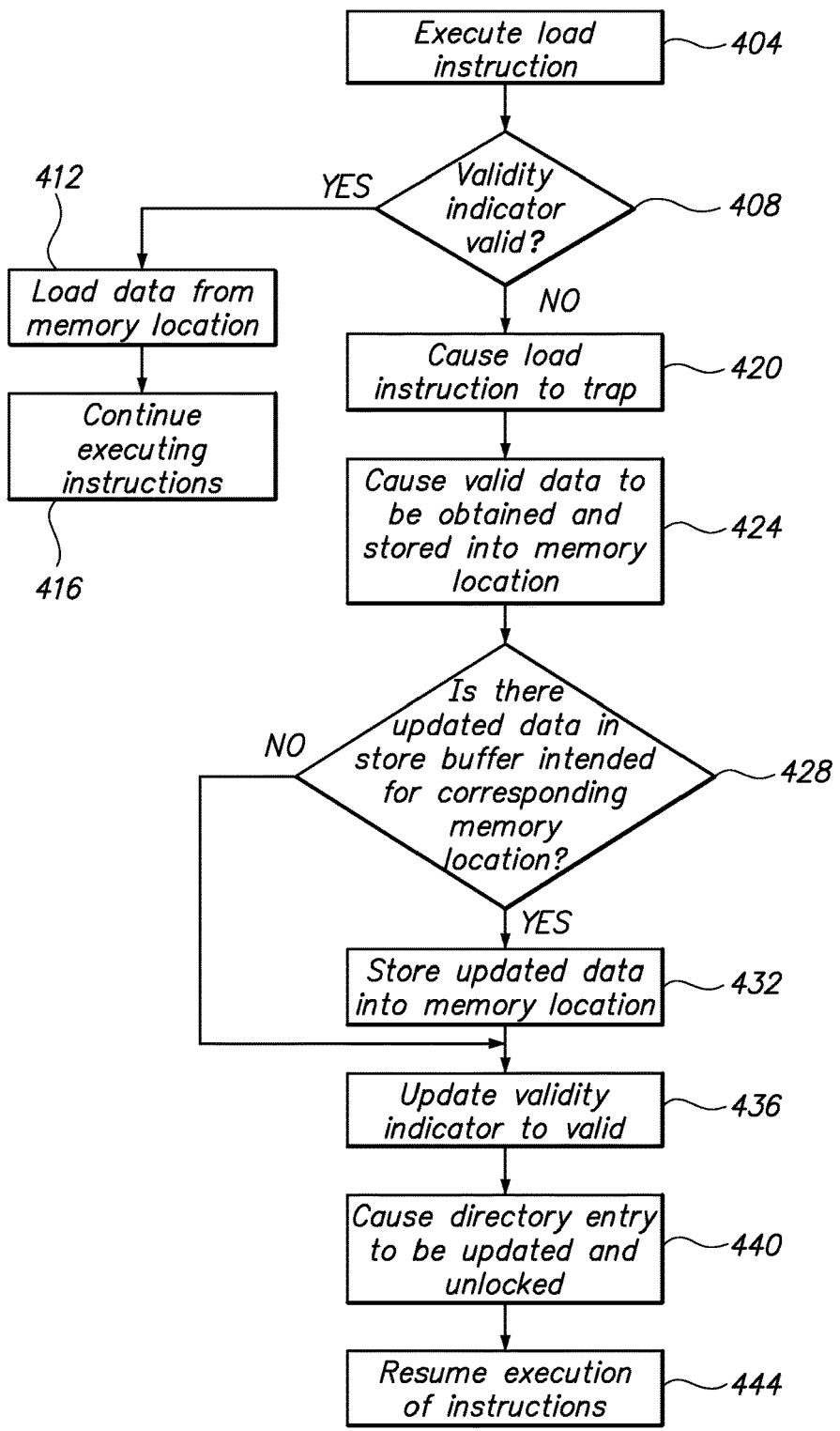
FIG. 4 shows an operational flow diagram illustrating the operations performed by a sharer node in loading data from a memory location, in accordance with one embodiment of the present invention.

During regular operation, at least one of the processors 106(1) (see FIG. 1) on sharer node 1 102(1) executes a set of program instructions (e.g. operating system 114(1), one of the applications 118(1), etc.) that pertains to a particular thread of execution. This set of program instructions may include a load instruction to load data from a particular memory location in node 1's main memory 108(1). For purposes of the following discussion, it will be assumed that the load instruction targets the memory location 316(1) (FIG. 3) in the mirrored portion 312(1) of node 1's main memory 108(1), to which the shared virtual address SVA1 is mapped. When the processor 106(1) executes (block 404 of the flowchart shown in FIG. 4) the load instruction, it checks the validity indicator associated with memory location 316 (1) to determine (block 408 of FIG. 4) whether the data currently stored in memory location 316(1) is valid. Recall that, in one embodiment, the validity indicator associated with a memory location takes the form of one or more bits stored within the memory location. If the validity indicator indicates valid, then the processor 106(1) loads (block 412 of FIG. 4) the data from the memory location 316(1) as usual, and continues executing (block 416 of FIG. 4) the instructions pertaining to the particular thread. However, if the validity indicator indicates invalid, then the processor 106(1) causes the load instruction to trap (block 420 of FIG. 4). When the load instruction traps, the processor 106(1) suspends execution of the set of instructions pertaining to the particular thread, and begins executing a set of trap handling instructions 116(1).

While executing the trap handling instructions, the processor 106(1) may perform the following operations. Initially, the processor 106(1) causes (block 424 of FIG. 4) valid data for memory location 316(1) to be obtained from a corresponding memory location 306 in the shared memory portion 302 of the main memory 108(2) of the home node 2 102(2). The processor 106(1) may also cause the valid data to be stored into memory location 316(1). In one embodiment, the processor 106(1) may cause the valid data to be obtained and stored in the following manner.

Initially, the processor 106(1) accesses the index structure portion 320(1) (FIG. 3) for the shared virtual address SVA1 to which the memory location 316(1) is mapped. Given this index structure portion 320(1), the processor 106(1) knows that: (a) node 2 102(2) is the home node for SVA1; (b) HNPA is the physical address of the memory location 306 in the home node's main memory that corresponds to memory location 316(1); and (c) DEPA is the physical address in the main memory 108(2) of the home node 102(2) where the directory entry 308 associated with the corresponding memory location 306 is stored.

In one embodiment, the processor 106(1) sends one or more instructions to the coprocessor 110(1) (FIG. 1) on node 1 102(1) to instruct the coprocessor 110(1) to lock the directory entry 308 on node 2 102(2), obtain the contents stored in the directory entry 308, obtain the valid data stored in the corresponding memory location 306 on node 2 102(2), and store the valid data into memory location 316(1) on node 1 102(1). As part of the one or more instructions, the processor 106(1) may provide to the coprocessor 110(1) the node identifier of node 2 102(2), the physical address DEPA of the directory entry 308 on node 2 102(2), the physical address HNPA of the corresponding memory location 306 on node 2 102(2), and the physical address SNPA(1) of the memory location 316(1) on node 1 102(1).

In response to the one or more instructions, the coprocessor 110(1) communicates and interacts with the coprocessor 110(2) on node 2 102(2) to cause the coprocessor 110(2) on node 2 102(2) to access the directory entry 308, lock the directory entry 308, provide a copy of the contents of the directory entry 308 to coprocessor 110(1), access the corresponding memory location 306, and provide a copy of the valid data stored in the corresponding memory location 306 to coprocessor 110(1). As part of this interaction, the coprocessor 110(1) may provide to coprocessor 110(2) the physical address DEPA of the directory entry 308 and the physical address HNPA of the corresponding memory location 306. The coprocessor 110(1) on node 1 102(1) thereafter stores the valid data into memory location 316(1) on node 1 102(1), and provides the contents of the directory entry 308 to processor 106(1).

After the valid data is stored into memory location 316(1), the processor 106(1), in one embodiment, checks the contents of the store buffer 318(1) on node 1 102(1) to determine (block 428 of FIG. 4) whether the store buffer 318(1) contains any updated data that is intended to be stored into the corresponding memory location 306 of the home node 102(2) but which has not been propagated yet to the home node 102(2). The processor 106(1) may do so, for example, by looking for entries in the store buffer 318(1) that indicate that the updated data in that entry is destined for SVA1. If the store buffer 318(1) does contain such updated data intended for the corresponding memory location 306, then the processor 106(1) stores (block 432 of FIG. 4) the updated data into memory location 316(1) (note: the updated data remains in the store buffer 318(1) so that it will eventually be propagated to the home node 102(2)). As a result, the data in memory location 316(1) will reflect both the valid data from corresponding memory location 306 and the updated data from the store buffer 318(1).

Thereafter, the processor 106(1) updates (block 436 of FIG. 4) the validity indicator associated with memory location 316(1) to valid. In addition, the processor 106(1) causes (block 440 of FIG. 4) the directory entry 308 to be updated and unlocked. The processor 106(1) may do this by updating its copy of the contents of the directory entry 308 to include the identifier of node 1 to indicate that node 1 102(1) is now a valid sharer of the corresponding memory location 306. Further, the processor 106(1) may send one or more instructions to the coprocessor 110(1) to instruct the coprocessor 110(1) to update and unlock the directory entry 308 on node 2 102(2). As part of the one or more instructions, the processor 106(1) may provide to the coprocessor 110(1) the node identifier of node 2 102(2), the physical address DEPA of the directory entry 308 on node 2 102(2), and the updated contents of the directory entry 308.

In response to the one or more instructions, the coprocessor 110(1) communicates and interacts with the coprocessor 110(2) on node 2 102(2) to cause the coprocessor 110(2) on node 2 102(2) to access the directory entry 308, update the contents therein, and unlock the directory entry 308. As part of this interaction, the coprocessor 110(1) may provide to the coprocessor 110(2) on node 2 102(2) the physical address DEPA of the directory entry 308 and the updated contents for the directory entry 308.

After sending the one or more instructions to the coprocessor 110(1) to instruct the coprocessor 110(1) to update and unlock the directory entry 308 (in one embodiment, the processor 106(1) does not wait for the coprocessor 110(1) to interact with coprocessor 110(2)), the processor 106(1) terminates execution of the trap handling instructions 116(1) and resumes (block 444 of FIG. 4) execution of the set of program instructions pertaining to the particular thread of execution. Upon resuming execution of the set of program instructions, the processor 106(1) re-executes the load instruction to load data from memory location 316(1). This time, because the validity indicator associated with memory location 316(1) is set to valid, the load operation should result in data being successfully loaded. In the manner described, a sharer node may handle a load from a memory location that is within a mirrored memory portion, in accordance with one embodiment of the present invention.

Alternative Embodiment(s)

In the embodiment described above, the processor 106(1) causes valid data for memory location 316(1) to be obtained from corresponding memory location 306 first, and then updates the valid data with the updated data from the store buffer. As an alternative, the processor 106(1) may obtain the updated data from the store buffer 318(1) and propagate it to memory location 306 of node 2 102(1) first, and then obtain the valid data from memory location 306 (the manner in which updated data may be propagated to the home node 102(2) will be described in a later section). With this approach, the valid data obtained from memory location 306 will already reflect the updated data from the store buffer 318(1); thus, there is no need for the processor 106(1) to perform any updates to the valid data.

Also, in the above embodiment, the contents of the directory entry 308 are passed from the home node 102(2) to the sharer node 102(1), updated by the sharer node 102(1), and then passed back to the home node 102(2). As an alternative, the contents of the directory entry 308 may stay at the home node 102(2), and the contents may be updated by the home node 102(2). For example, the processor 106(1) on the sharer node 102(1) may send one or more instructions to the coprocessor 110(1) to instruct the coprocessor 110(1) to: update the contents of the directory entry 308 to indicate that the sharer node 102(1) is now a valid sharer of corresponding memory location 306; and unlock the directory entry 308. In response, the coprocessor 110(1) may communicate and interact with the coprocessor 110(2) on node 2 102(2) to cause the coprocessor 110(2) on node 2 102(2) to access the directory entry 308, update the contents to indicate that the sharer node 102(1) is now a valid sharer of corresponding memory location 306, and unlock the directory entry 308.

These and other alternative approaches are within the scope of the present invention.

Sharer Node Store

Figure 5:
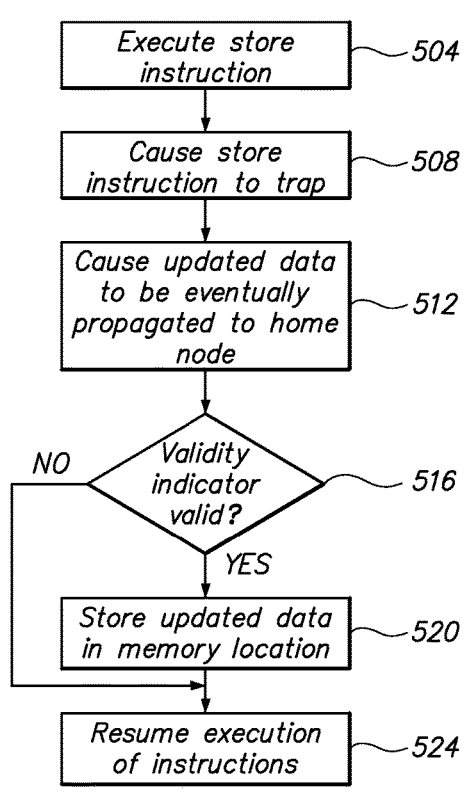
FIG. 5 shows an operational flow diagram illustrating the operations performed by a sharer node in storing data to a memory location, in accordance with one embodiment of the present invention.

During regular operation, one or more processors 106(1) on sharer node 1 102(1) may execute a set of program instructions (e.g. operating system 114(1), one or more of the applications 118(1), etc.) that pertains to a particular thread of execution that includes a store instruction to store updated data to a particular memory location in node 1's main memory 108(1). The store instruction may target a memory location that is within the mirrored memory portion 312(1) of node 1's main memory 108(1). For purposes of the following discussion, it will be assumed that the store instruction targets memory location 316(1), to which the shared virtual address SVA1 is mapped. When the processor 106(1) executes (block 504 of the flowchart shown in FIG. 5) the store instruction, it determines whether the target memory location 316(1) is a writable location. In one embodiment, the processor 106(1) makes this determination by consulting the address translation table that maps virtual addresses to physical addresses. If the entry in the address translation table corresponding to the SVA1/SNPA(1) mapping for memory location 316(1) indicates that the memory location 316(1) is writable, then the store operation can proceed as usual. However, if the address translation table entry indicates that the memory location 316(1) is not writable (e.g. read-only), then, in one embodiment, the processor 106(1) causes the store instruction to trap (block 508 of FIG. 5). Recall from previous discussion that, during initialization, all memory locations in the mirrored memory portion of a sharer node have their address translation table entries set to read-only. Thus, this store instruction will result in a trap. In fact, in one embodiment, all store instructions that target a memory location within mirrored memory portion 312(1) will result in a trap. When the store instruction traps, the processor 106(1) suspends execution of the set of instructions pertaining to the particular thread, and begins executing a set of trap handling instructions 116(1). In one embodiment, as part of the transition from the particular thread to the trap handling instructions, the processor 106(1) obtains the thread identifier of the particular thread and the updated data that is intended for memory location 316(1).

While executing the trap handling instructions, the processor 106(1) may perform the following operations. Initially, the processor 106(1) accesses the index structure portion 320(1) for the shared virtual address SVA1 to which the memory location 316(1) is mapped. From the information in this index structure portion 320(1), the processor 106(1) knows that: (a) node 2 102(2) is the home node for SVA1; and (b) HNPA is the physical address of the memory location 306 in the home node's main memory that corresponds to memory location 316(1). Thus, the processor 106(1) knows that it is acting as a sharer node in this instance. That being the case, the processor 106(1) knows that it should cause (block 512 of FIG. 5) the updated data that is intended for memory location 316(1) to eventually be propagated to memory location 306 on node 2 102(2). In one embodiment, the processor 106(1) causes the updated data to eventually be propagated to memory location 306 on node 2 102(1) by storing the updated data into the store buffer 318(1) on node 1 102(1).

To do so, the processor 106(1), in one embodiment, determines whether the store buffer 318(1) currently contains any existing updated data that is destined for memory location 306 on node 2 102(1) (the processor 106(1) may make this determination, for example, by looking for an entry in the store buffer 318(1) that has SVA1 associated therewith). If such an entry is found, then the processor 106(1) locks the entry, merges the existing updated data in the entry with the new updated data intended for memory location 316(1), and unlocks the entry. On the other hand, if the store buffer 318(1) does not currently contain any existing updated data destined for memory location 306 of node 2 102(2), then the processor 106(1) adds an entry to the store buffer 318(1). This entry may include the updated data, an indication that the updated data is destined for memory location 306 of node 2 102(2) (this indication may include, for example, SVA1), and optionally a thread identifier for the particular thread that contained the store operation. This thread identifier allows all entries in the store buffer 318(1) that are associated with a certain thread to be easily identified.

In addition, the processor 106(1), in one embodiment, determines (block 516 of FIG. 5) whether the validity indicator associated with memory location 316(1) is set to valid. If so, then the processor 106(1) stores (block 520 of FIG. 5) the updated data into memory location 316(1). Otherwise, the updated data is not stored into memory location 316(1).

Thereafter, the processor 106(1) terminates execution of the trap handling instructions 116(1), and resumes (block 524 of FIG. 5) execution of the set of program instructions pertaining to the particular thread of execution at the instruction after the store instruction. Since the updated data has already been stored (if it is stored at all) into the memory location 316(1), there is no need to re-execute the store instruction. In the manner described, a sharer node may handle a store to a memory location that is within a mirrored memory portion, in accordance with one embodiment of the present invention.

Update Propagation

The above discussion describes the operations that are performed when the store instruction traps. These operations are only part of the data update process. To complete the process, the updated data that is stored in the store buffer 318(1) is, at some point, propagated to the home node 102(2). In one embodiment, this is achieved by having one or more processors 106(1) on the sharer node 1 102(1) execute a set of update propagation instructions. These update propagation instructions may be part of the instructions that included the store instruction, or they may be part of a separate set of instructions. The update propagation instructions may be executed as part of the same thread as the store instruction or as part of a different thread. The processor 106(1) that executes the update propagation instructions may be the same processor that executed the store instruction, or it may be a different processor. In fact, in one embodiment, the processor that executes the update propagation instructions may be the coprocessor 110(1). Thus, for purposes of the update propagation instructions, the coprocessor 110(1) may be treated as a processor. In the following discussion, it will be assumed for the sake of example that the update propagation instructions are executed by one of the processors 106(1) on node 1 102(1), which may or may not be the same processor that executed the store instruction.

Figure 6:
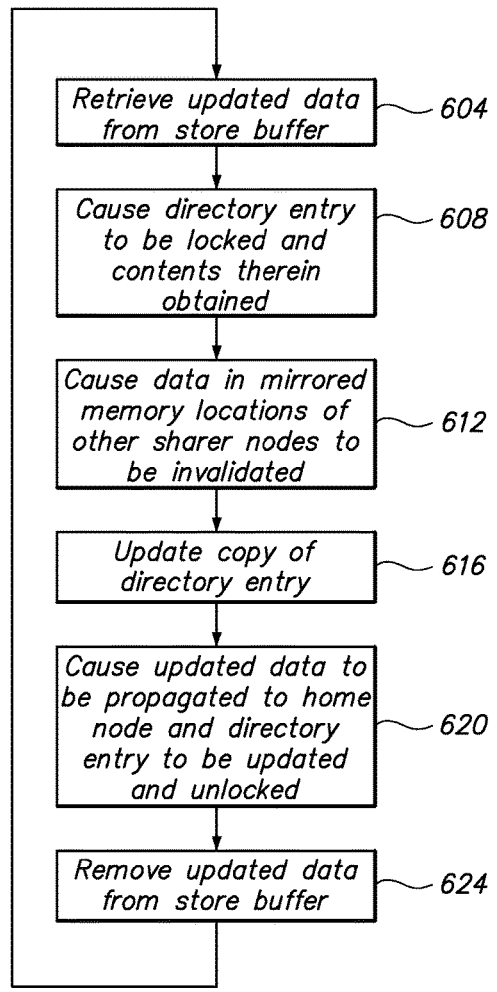
FIG. 6 shows an operational flow diagram illustrating the operations performed by a sharer node in propagating updated data to a home node, in accordance with one embodiment of the present invention.

While executing the update propagation instructions, the processor 106(1) may perform the following operations. Initially, the processor 106(1) selects one of the entries in the store buffer 318(1). This selection may be made, for example, randomly, sequentially, based upon a certain order (e.g. first in first out, last in first out, etc.), based upon the thread identifier stored in the entry, or based upon any other desired criteria. For the sake of example, it will be assumed that the selected entry is the one that contains the updated data from the previously discussed store instruction that is destined for memory location 306 on node 2 102(2). The processor 106(1) locks the selected entry and retrieves (block 604 of the flowchart shown in FIG. 6) the information stored in the entry, which may include the updated data and an indication that the updated data is destined for memory location 306 on node 2 102(2) (this indication may include, for example, SVA1). The processor 106(1) may then access the index structure portion 320(1) for SVA1. From the information in this index structure portion 320(1), the processor 106(1) knows that: (a) node 2 102(2) is the home node for SVA1; (b) HNPA is the physical address of the memory location 306 in the home node's main memory 108(2) that is the intended destination for the updated data; and (c) DEPA is the physical address in the main memory 108(2) of the home node 102(2) where the directory entry 308 associated with the memory location 306 is stored.

Using this information, the processor 106(1) causes (block 608 of FIG. 6) the directory entry 308 to be locked and the contents contained therein to be obtained. In one embodiment, the processor 106(1) does so by sending one or more instructions to the coprocessor 110(1) on node 1 102(1) to instruct the coprocessor 110(1) to lock the directory entry 308 on node 2 102(2) and to obtain the contents stored therein. As part of the one or more instructions, the processor 106(1) may provide to the coprocessor 110(1) the node identifier of node 2 102(2) and the physical address DEPA of the directory entry 308 on node 2 102(2).

In response to the one or more instructions, the coprocessor 110(1) communicates and interacts with the coprocessor 110(2) on node 2 102(2) to cause the coprocessor 110(2) on node 2 102(2) to access the directory entry 308, lock the directory entry 308, and provide a copy of the contents of the directory entry 308 to coprocessor 110(1). As part of this interaction, the coprocessor 110(1) may provide to coprocessor 110(2) the physical address DEPA of the directory entry 308. The coprocessor 110(1) on node 1 102(1) thereafter makes the contents of the directory entry 308 available to processor 106(1).

As noted previously, a directory entry 308 comprises sharing information for the memory location 306 with which it is associated. This sharing information indicates which node/nodes (if any) is/are currently a valid sharer of that memory location 306. For the sake of example, it will be assumed that the directory entry 308 indicates that node 3 102(3) is currently a valid sharer of memory location 306. This means that node 3 102(3) has a mirrored memory location 316(3) in its main memory 108(3) that mirrors memory location 306, and that the validity indicator associated with that memory location 316(3) is currently set to valid. Because data in memory location 306 of the home node 102(2) is about to be updated, the data in mirrored memory location 316(3) of node 3 102(3) is about to be made invalid. To prevent node 3 102(3) from using invalid data, the processor 106(1), in one embodiment, causes (block 612 of FIG. 6) the data in mirrored memory location 316(3) of node 3 102(3) to be invalidated.

The processor 106(1) may do so by obtaining, from the index structure portion 320(1), the node identifier of node 3 102(3) and the physical address SNPA(3) of the mirrored memory location 316(3) on node 3 102(3). The processor 106(1) may then send one or more instructions to the coprocessor 110(1) of node 1 102(2) to instruct the coprocessor 110(1) to invalidate the data in memory location 316(3) of node 3 102(3). As part of the one or more instructions, the processor 106(1) may provide to the coprocessor 110(1) the node identifier of node 3 102(3) and the physical address SNPA(3) of the memory location 316(3) on node 3 102(3).

In response to the one or more instructions, the coprocessor 110(1) communicates and interacts with the coprocessor 110(3) on node 3 102(3) to cause the coprocessor 110(3) on node 3 102(3) to access the memory location 316(3) and to set the validity indicator associated with memory location 316(3) to invalid. As part of this interaction, the coprocessor 110(1) may provide to the coprocessor 110(3) on node 3 102(3) the physical address SNPA(3) of the memory location 316(3). The processor 106(1) may repeat the above invalidation process for each of the sharer nodes indicated by the directory entry 308 as being a valid sharer of memory location 306. After that is done, the processor 106(1) may update (block 616 of FIG. 6) its copy of the directory entry 308 such that the directory entry 308 no longer indicates any sharer nodes (other than perhaps sharer node 1 102(2)) as being a valid sharer of memory location 306.

In addition to the above operations, the processor 106(1) causes (block 620 of FIG. 6) the updated data for memory location 306 to be propagated to node 2 102(2), and the directory entry 308 to be updated and unlocked. The processor 106(1) may do so by sending one or more instructions to the coprocessor 110(1) to instruct the coprocessor 110(1) to store the updated data into memory location 306 of node 2 102(2), and to update and unlock the directory entry 308 on node 2 102(2). As part of the one or more instructions, the processor 106(1) may provide to the coprocessor 110(1) the node identifier of node 2 102(2), the physical address HNPA of the memory location 306 on node 2 102(2), the updated data to be stored into memory location 306, the physical address DEPA of the directory entry 308 on node 2 102(2), and the updated contents for the directory entry 308.

In response to the one or more instructions, the coprocessor 110(1) communicates and interacts with the coprocessor 110(2) on node 2 102(2) to cause the coprocessor 110(2) on node 2 102(2) to access memory location 306, store the updated data into memory location 306, access the directory entry 308, update the contents of the directory entry 308, and unlock the directory entry 308. As part of this interaction, the coprocessor 110(1) may provide to the coprocessor 110(2) on node 2 102(2) the physical address HNPA of memory location 306, the updated data for memory location 306, the physical address DEPA of the directory entry 308, and the updated contents for the directory entry 308.

After the updated data is propagated to the home node 2 102(2), the processor 106(1) removes (block 624 of FIG. 6) the selected entry from the store buffer 318(1). The processor 106(1) may then loop back to block 604 to select another entry from the store buffer 318(1) and to repeat the above process. In the manner described, updated data may be propagated from a sharer node to a home node, in accordance with one embodiment of the present invention.

Alternative Embodiments

In the embodiment described above for performing a sharer node store, the updated data from the store instruction is not propagated right away to memory location 306 of the home node 102(2). Rather, the updated data is first stored into the store buffer 318(1), and then later propagated to the home node 102(2) by execution of the update propagation instructions. As an alternative, each time a store instruction is trapped, the trap handling instructions may cause the updated data from the store instruction to be propagated right away to the home node (this approach may be referred to as the "force all stores to home" approach). Under such an approach, no store buffer would be needed. Also, no separate set of update propagation instructions would be needed. Rather, the propagation of the updated data to the home node would be performed under control of the trap handling instructions.

To illustrate how the "force all stores to home" approach may be implemented in accordance with one embodiment of the present invention, reference will be made to the example above in which a store instruction targeting memory location 316(1) is trapped. While executing the trap handling instructions, the processor 106(1) causes the updated data from the store instruction to be propagated to the home node 102(2), and stored into corresponding memory location 306. This may be carried out in a manner similar to that described above in connection with the update propagation instructions. In addition, the processor 106(1) may perform one of several operations locally. Under the "self-invalidating" option, the processor 106(1) may set the validity indicator associated with memory location 316(1) to invalid. Doing so will invalidate the data currently stored in memory location 316(1), and cause a trap to take place the next time a load instruction targets memory location 316(1). Under the "non-self-invalidating" option, the processor 106(1) may check the validity indicator associated with memory location 316 (1). If the validity indicator indicates valid, then the processor 106(1) stores the updated data from the store instruction into memory location 316(1). Otherwise, the processor 106(1) will not update the data in memory location 316(1). Thereafter, the processor 106(1) terminates execution of the trap handling instructions 116(1), and resumes execution of the set of program instructions that included the store instruction. In one embodiment, execution of the program instructions is resumed at the instruction after the store instruction.

These and other alternative approaches are within the scope of the present invention.

Home Node Load and Store

In one embodiment, a home node 102(2) may perform a load from a memory location that is within the shared memory portion 302 of its main memory 108(2) in the same manner that it would a load from any other memory location. In one embodiment, data in the memory locations within the shared memory portion 302 are assumed to be always valid (recall that during initialization, the validity indicators associated with all of the memory locations within the shared memory portion 302 are set to valid). Thus, there is no need to trap these load instructions in a home node 102(2).

Store instructions performed by a home node, however, may be trapped. The manner in which a store instruction may be handled by a home node, in accordance with one embodiment of the present invention, will now be described. During regular operation, one or more processors 106(2) on the home node 2 102(2) may execute a set of program instructions (e.g. operating system 114(2), one or more of the applications 118(2), etc.) that pertains to a particular thread of execution that includes a store instruction to store updated data into a particular memory location in node 2's main memory 108(2). The store instruction may target a memory location that is within the shared memory portion 302 of node 2's main memory 108(2). For purposes of the following discussion, it will be assumed that the store instruction targets memory location 306, which has a physical address of HNPA, to which the shared virtual address SVA1 is mapped.

Figure 7:
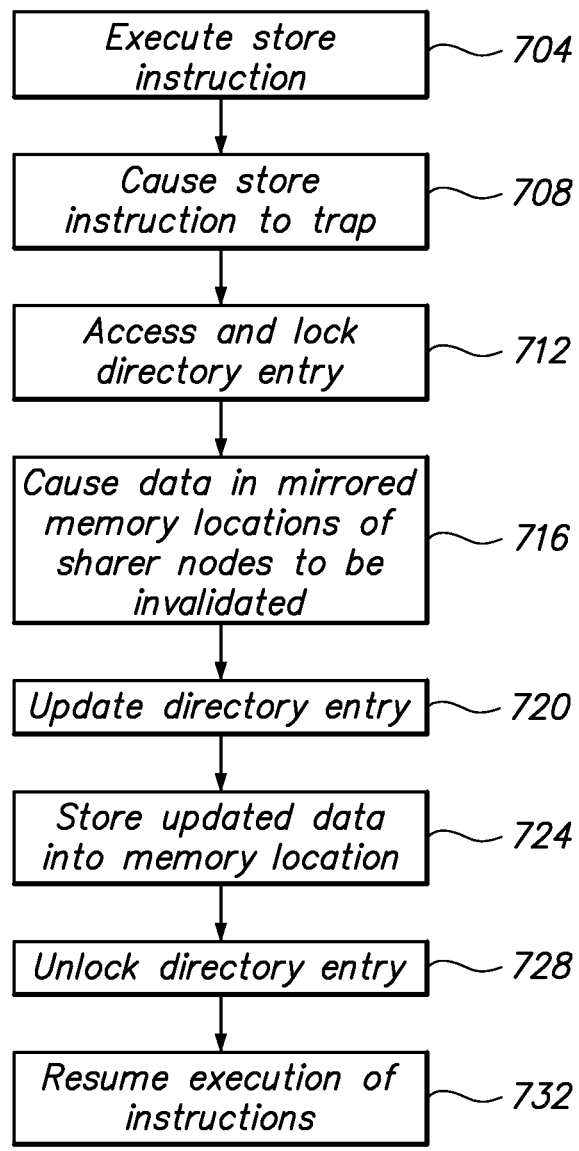
FIG. 7 shows an operational flow diagram illustrating the operations performed by a home node in storing data to a memory location, in accordance with one embodiment of the present invention.

When the processor 106(2) executes (block 704 of the flowchart shown in FIG. 7) the store instruction, it determines whether the target memory location 306 is a writable location. In one embodiment, the processor 106(2) makes this determination by consulting the address translation table that maps virtual addresses to physical addresses. If the entry in the address translation table corresponding to the SVA1/HNPA mapping for memory location 306 indicates that the memory location 306 is writable, then the store operation can proceed as usual. However, if the address translation table entry indicates that the memory location 306 is not writable (e.g. read-only), then, in one embodiment, the processor 106(2) causes the store instruction to trap (block 708 of FIG. 7). Recall from previous discussion that, during initialization, all memory locations in the shared memory portion of a home node have their address translation table entries set to read-only. Thus, this store instruction will result in a trap. In fact, in one embodiment, all store instructions that target a memory location within shared memory portion 302 will result in a trap. When the store instruction traps, the processor 106(2) suspends execution of the set of instructions pertaining to the particular thread, and begins executing a set of trap handling instructions 116(2). In one embodiment, as part of the transition from the particular thread to the trap handling instructions, the processor 106(2) obtains the updated data that is intended for memory location 306.

While executing the trap handling instructions, the processor 106(2) may perform the following operations. Initially, the processor 106(1) accesses the index structure portion 320(2) for the shared virtual address SVA1 to which the memory location 306 is mapped. From the information in this index structure portion 320(2), the processor 106(2) can see that no home node is identified; thus, it knows that it is acting as the home node in this instance. The processor 106(2) also knows from the index structure portion 320(2) that the physical address of the directory entry 308 associated with memory location 306 is DEPA. Using this physical address, the processor 106(2) accesses (block 712 of FIG. 7) the directory entry 308, locks the directory entry 308, and reads its contents.

From the contents of the directory entry 308, the processor 106(2) determines which node/nodes (if any) is/are currently a valid sharer of memory location 306. For the sake of example, it will be assumed that the directory entry 308 indicates that node 1 102(1) and node 3 102(3) are currently valid sharers of memory location 306. This means that node 1 102(1) has a mirrored memory location 316(1) in its main memory 108(1) that mirrors memory location 306, and that the validity indicator associated with that memory location 316(1) is currently set to valid. It also means that node 3 102(3) has a mirrored memory location 316(3) in its main memory 108(3) that mirrors memory location 306, and that the validity indicator associated with that memory location 316(3) is currently set to valid. Because data in memory location 306 is about to be updated, the data in memory locations 316(1) and 316(3) are about to be made invalid. To prevent node 1 102(1) and node 3 102(3) from using invalid data, the processor 106(2), in one embodiment, causes (block 716 of FIG. 7) the data in memory locations 316(1) and 316(3) to be invalidated.

The processor 106(2) may do so by obtaining, from the index structure portion 320(2), the node identifier of node 1 102(1) and the physical address SNPA(1) of the mirrored memory location 316(1) on node 1 102(1). The processor 106(2) may then send one or more instructions to the coprocessor 110(2) on node 2 102(2) to instruct the coprocessor 110(2) to invalidate the data in memory location 316(1) of node 1 102(1). As part of the one or more instructions, the processor 106(2) may provide to the coprocessor 110(2) the node identifier of node 1 102(1) and the physical address SNPA(1) of the memory location 316(1) on node 1 102(1).

In response to the one or more instructions, the coprocessor 110(2) communicates and interacts with the coprocessor 110(1) on node 1 102(1) to cause the coprocessor 110(1) on node 1 102(1) to access the memory location 316(1) and to set the validity indicator associated with memory location 316(1) to invalid. As part of this interaction, the coprocessor 110(2) may provide to the coprocessor 110(1) on node 1 102(1) the physical address SNPA(1) of the memory location 316(1).

The processor 106(2) may also obtain, from the index structure portion 320(2), the node identifier of node 3 102(3) and the physical address SNPA(3) of the memory location 316(3) on node 3 102(3). The processor 106(2) may then send one or more instructions to the coprocessor 110(2) on node 2 102(2) to instruct the coprocessor 110(2) to invalidate the data in memory location 316(3) on node 3 102(3). As part of the one or more instructions, the processor 106(2) may provide to the coprocessor 110(2) the node identifier of node 3 102(3) and the physical address SNPA(3) of the memory location 316(3) on node 3 102(3).

In response to the one or more instructions, the coprocessor 110(2) communicates and interacts with the coprocessor 110(3) on node 3 102(3) to cause the coprocessor 110(3) on node 3 102(3) to access the memory location 316(3) and to set the validity indicator associated with memory location 316(3) to invalid. As part of this interaction, the coprocessor 110(2) may provide to the coprocessor 110(3) on node 3 102(3) the physical address SNPA(3) of the memory location 316(3).

The processor 106(2) may repeat the above invalidation process for each of the sharer nodes indicated by the directory entry 308 as being a valid sharer of memory location 306. After that is done, the processor 106(2) updates (block 720 of FIG. 7) the directory entry 308 such that the directory entry 308 no longer indicates any sharer nodes as being a valid sharer of memory location 306.

In addition to the above operations, the processor 106(2) stores (block 724 of FIG. 7) the updated data into memory location 306, and unlocks (block 728 of FIG. 7) the directory entry 308. Thereafter, the processor 106(2) terminates execution of the trap handling instructions 116(2), and resumes (block 732 of FIG. 7) execution of the set of program instructions pertaining to the particular thread of execution at the instruction after the store instruction. Since the updated data has already been stored into memory location 306, there is no need to re-execute the store instruction. In the manner described, a home node may handle a store to a memory location that is within a shared memory portion, in accordance with one embodiment of the present invention.

Alternative Embodiment

In the embodiment described above, it is the processor 106(2), under direction of the trap handling instructions 116(2), that causes data in the mirrored memory locations 316(1) and 316(3) of the sharer nodes 102(1) and 102(3) to be invalidated. It is also the processor 106(2), under direction of the trap handling instructions 116(2), that causes the information in the directory entry 308 to be updated to no longer indicate node 1 102(1) and node 3 102(3) as being valid sharers of memory location 306. As an alternative, under direction of the trap handling instructions 116(2), the processor 106(2) may just store the updated data into memory location 306, and store some information into a buffer (not shown) indicating that data in memory location 306 has been updated. A processor (the same or a different processor), executing a set of invalidation instructions, may at a later point access the information stored in the buffer, and proceed to cause the data in the mirrored memory locations 316(1) and 316(3) of the sharer nodes 102(1) and 102(3) to be invalidated, and cause the information in the directory entry 308 to be updated to no longer indicate node 1 102(1) and node 3 102(3) as being valid sharers of memory location 306. This and other alternative approaches are within the scope of the present invention.

At this point, it should be noted that although the invention has been described with reference to specific embodiments, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims.

What is claimed is:

1. In a distributed system comprising a first node and a second node, wherein the first node has a first main memory and the second node has a second main memory, wherein the first main memory and the second main memory comprise random access memory, a method performed by the first node, comprising:
generating and storing, in the first main memory, a mapping that maps one or more memory addresses in a first memory location in the first main memory to one or more virtual memory addresses corresponding to a second memory location in the second main memory;
executing, by a processor on the first node, a set of program instructions pertaining to a particular thread of execution, wherein the set of program instructions includes a load instruction to load data from the first memory location of the first main memory, and a store instruction to store updated data into the first memory location of the first main memory;
wherein executing the load instruction comprises:
determining, by the processor, whether the data in the first memory location is valid;
in response to a determination that the data in the first memory location is invalid, causing the load instruction to trap, which causes the processor to suspend execution of the set of program instructions and to begin execution of a first set of trap handling instructions;
wherein executing the first set of trap handling instructions causes:
based on the mapping, obtaining valid data from the second memory location of the second main memory, and storing the valid data into the first memory location of the first main memory; and
updating a validity indicator to indicate that the data in the first memory location is valid; and
resuming, by the processor, execution of the set of program instructions;
wherein executing the store instruction comprises:
causing the store instruction to trap, which causes the first processor to suspend execution of the set of program instructions and to begin execution of a second set of trap handling instructions;
wherein the second set of trap handling instructions causes, based on the mapping, propagating the updated data to the second node to be stored within the second memory location of the second main memory; and
resuming, by the first processor, execution of the set of program instructions.

2. The method of claim 1, wherein the first node comprises a coprocessor, and wherein causing valid data to be obtained from the second memory location of the second main memory, and stored into the first memory location of the first main memory comprises:
the processor providing one or more instructions to the coprocessor to cause the coprocessor to obtain the valid data from the second memory location of the second main memory, and to store the valid data into the first memory location of the first main memory.

3. The method of claim 1, wherein the first node comprises a first coprocessor and the second node comprises a second coprocessor, and wherein causing valid data to be obtained from the second memory location of the second main memory, and stored into the first memory location of the first main memory comprises:
the processor providing one or more instructions to the first coprocessor to cause the first coprocessor to obtain, through interaction with the second coprocessor, the valid data from the second memory location of the second main memory, and to store the valid data into the first memory location of the first main memory.

4. The method of claim 1, wherein: while executing the set of trap handling instructions, the processor further causing:
a directory entry associated with the second memory location of the second main memory of the second node to be locked, wherein the directory entry is stored on the second node;
information in the directory entry to be updated to indicate that the first node is a valid sharer of the second memory location of the second main memory; and
the directory entry to be unlocked.

5. The method of claim 1, wherein:
while executing the set of trap handling instructions, the processor further causing:
updated data to be obtained from a store buffer on the first node, wherein the updated data is intended to be stored in the second memory location of the second main memory of the second node but has not been propagated to the second node yet; and
the updated data to be stored into the first memory location of the first main memory.

6. The method of claim 1, wherein:
while executing the set of trap handling instructions, and prior to causing the valid data to be obtained from the second memory location of the second main memory, and stored into the first memory location of the first main memory, the processor causing:
updated data to be obtained from a store buffer on the first node, wherein the updated data is intended to be stored in the second memory location of the second main memory of the second node but has not been propagated to the second node yet; and
the updated data to be propagated to the second node and stored within the second memory location of the second main memory to give rise to an updated set of data which represents valid data.

7. The method of claim 1, wherein the method further comprises:
while executing the set of trap handling instructions, the first processor: storing the updated data into the first memory location of the first main memory; and
wherein causing the updated data to eventually be propagated to the second node comprises:

storing the updated data into a store buffer for eventual propagation to the second node.

8. The method of claim 1,
wherein causing the updated data to be propagated to the second node comprises:
storing the updated data into a store buffer for propagation to the second node.

9. The method of claim 8, wherein storing the updated data into a store buffer for propagation to the second node comprises:
determining whether the store buffer contains existing updated data that is destined for the second memory location of the second main memory; and
in response to a determination that the store buffer contains existing updated data that is destined for the second memory location of the second main memory, merging the updated data with the existing updated data in the store buffer.

10. The method of claim 8, further comprising:
after resuming execution of the set of program instructions, and while executing the set of program instructions, the first processor:
retrieving the updated data from the store buffer; and
causing the updated data to be propagated to the second node and stored within the second memory location of the second main memory.

11. The method of claim 8, further comprising:
a second processor retrieving the updated data from the store buffer; and
the second processor causing the updated data to be propagated to the second node and stored within the second memory location of the second main memory;
wherein the second processor may be the first processor or another processor on the first node.

12. The method of claim 11, wherein the first node comprises a first coprocessor and the second node comprises a second coprocessor, and wherein causing the updated data to be propagated to the second node and stored within the second memory location of the second main memory comprises:
the second processor providing one or more instructions to the first coprocessor to cause the first coprocessor to interact with the second coprocessor to cause the updated data to be propagated to the second node and to be stored within the second memory location of the second main memory.

13. The method of claim 8, wherein the distributed system further comprises a third node, wherein the third node has a third main memory, wherein the mapping also maps the one or more virtual memory addresses to one or more memory addresses in a third memory location in the third main memory, and wherein the method further comprises:
a second processor retrieving the updated data from the store buffer; and the second processor causing:
the updated data to be propagated to the second node and stored within the second memory location of the second main memory; and
based on the mapping, data currently stored in the third memory location of the third main memory of the third node to be invalidated;
wherein the second processor may be the first processor or another processor on the first node.

14. The method of claim 13, wherein the first node comprises a first coprocessor and the third node comprises a second coprocessor, and wherein causing data currently stored in the third memory location of the third main memory of the third node to be invalidated comprises:
the second processor providing one or more instructions to the first coprocessor to cause the first processor to interact with the second coprocessor to cause the data currently stored in the third memory location of the third main memory to be invalidated.

15. The method of claim 8, further comprising:
a second processor retrieving the updated data from the store buffer; and the second processor causing:
a directory entry associated with the second memory location of the second main memory to be locked, wherein the directory entry is stored on the second node; and
the updated data to be propagated to the second node and stored within the second memory location of the second main memory; and the directory entry to be unlocked; wherein
the second processor may be the first processor or another processor on the first node.

16. The method of claim 8, wherein the distributed system further comprises a third node, wherein the third node has a third main memory, wherein the mapping also maps the one or more memory addresses in the second memory location of the second main memory to one or more memory addresses in a third memory location in the third main memory, and wherein the method further comprises:
a second processor retrieving the updated data from the store buffer; and
the second processor causing:
a directory entry associated with the second memory location of the second main memory to be locked, wherein the directory entry is stored on the second node, and wherein information in the directory entry indicates that the third node is currently a valid sharer of the second memory location of the second main memory;
the updated data to be propagated to the second node and stored within the second memory location of the second main memory;
data stored in the third memory location of the third main memory of the third node to be invalidated;
the information in the directory entry to be updated such that the information no longer indicates the third node as a valid sharer of the second memory location of the second main memory; and
the directory entry to be unlocked;
wherein the second processor may be the first processor or another processor on the first node.

17. The method of claim 1,
wherein the method further comprises:
while executing the set of trap handling instructions, the first processor:
storing the updated data into the first memory location of the first main memory; and
wherein causing the updated data to be propagated to the second node comprises:
causing the updated data to be propagated to the second node and stored within the second memory location of the second main memory.

18. The method of claim 1,
wherein the method further comprises:
while executing the set of trap handling instructions, the first processor:
invalidating data currently stored in the first memory location of the first main memory; and
wherein causing the updated data to be propagated to the second node comprises:

causing the updated data to be propagated to the second node and stored within the second memory location of the second main memory.

19. The method of claim 1 wherein executing the store instruction further comprises:
   determining whether the first memory location of the first main memory is writeable;
   in response to determining the first memory location is not writeable, causing the store instruction to trap.

20. A first node for use in a distributed computing system, the first node comprising:
   a first main memory, wherein the first main memory stores a mapping that maps one or more memory addresses in a first memory location in the first main memory to one or more virtual memory addresses corresponding to a second memory location in a second main memory on a second node of the distributed system, wherein the first main memory and the second main memory comprise random access memory;
   a first set of trap handling instructions and a second set of trap handling instructions; and
   one or more processors including a first processor, the first processor operable to execute a load instruction to load data from the first memory location of the first main memory, and a store instruction to store data into the first memory location of the first main memory, wherein the load instruction and the store instruction are part of a set of program instructions pertaining to a particular thread of execution;
   wherein executing the load instruction includes determining whether data in the first memory location of the first main memory is valid, and in response to a determination that the data in the first memory location of the first main memory is invalid, to cause the load instruction to trap, which would cause the first processor to suspend execution of the set of program instructions and to begin execution of the first set of trap handling instructions; and
   wherein the first set of trap handling instructions, when executed by the first processor, would cause the first processor to cause:
      valid data to be obtained from the second memory location of the second main memory based on the mapping, and stored into the first memory location of the first main memory; and
      a validity indicator to be updated to indicate that the data in the first memory location is valid; and
      execution of the set of program instructions to be resumed;
   wherein the first processor comprises circuitry operable to cause the store instruction to trap, which would cause the first processor to suspend execution of the set of program instructions and to begin execution of the second set of trap handling instructions; and
   wherein the second set of trap handling instructions, when executed by the first processor, would cause the first processor to:
      cause the updated data to be propagated to the second node to be stored within the second memory location of the second main memory based on the mapping; and
      resume execution of the set of program instructions.

21. The first node of claim 20,
   wherein the first node further comprises a first coprocessor; and
   wherein the set of trap handling instructions, when executed by the first processor, would cause the first processor to cause valid data to be obtained from the second memory location of the second main memory, and stored into the first memory location of the first main memory by providing one or more instructions to the first coprocessor; and
   wherein the first coprocessor is operable to respond to the one or more instructions by obtaining, through interaction with a second coprocessor on the second node, the valid data from the second memory location of the second main memory, and storing the valid data into the first memory location of the first main memory.

22. The first node of claim 20, wherein the set of trap handling instructions, when executed by the first processor, would cause the first processor to further cause:
   a directory entry associated with the second memory location of the second main memory of the second node to be locked, wherein the directory entry is stored on the second node;
   information in the directory entry to be updated to indicate that the first node is a valid sharer of the second memory location of the second main memory; and
   the directory entry to be unlocked.

23. The first node of claim 20,
   wherein the first node further comprises a store buffer; and
   wherein the set of trap handling instructions, when executed by the first processor, would cause the first processor to further cause:
      updated data to be obtained from the store buffer, wherein the updated data is intended to be stored in the second memory location of the second main memory of the second node but has not been propagated to the second node yet; and
      the updated data to be stored into the first memory location of the first main memory.

24. The first node of claim 20,
   wherein the first node further comprises a store buffer; and
   wherein the set of trap handling instructions, when executed by the first processor, would cause the first processor, prior to causing the valid data to be obtained from the second memory location of the second main memory, and stored into the first memory location of the first main memory, to cause:
      updated data to be obtained from the store buffer, wherein the updated data is intended to be stored in the second memory location of the second main memory of the second node but has not been propagated to the second node yet; and
      the updated data to be propagated to the second node and stored within the second memory location of the second main memory to give rise to an updated set of data which represents valid data.

25. The first node of claim 20,
   wherein the first node further comprises a store buffer;
   wherein the trap handling instructions, when executed by the first processor, would further cause the first processor to:
      store the updated data into the first memory location of the first main memory; and
   wherein the trap handling instructions, when executed by the first processor, would cause the first processor to cause the updated data to be propagated to the second node by storing the updated data into the store buffer for propagation to the second node.

26. The first node of claim 20,
   wherein the first node further comprises a store buffer; and
   wherein the trap handling instructions, when executed by the first processor, would cause the first processor to cause the updated data to be propagated to the second node by storing the updated data into the store buffer for propagation to the second node.

27. The first node of claim 26,
wherein storing the updated data into the store buffer for propagation to the second node comprises:
   determining whether the store buffer contains existing updated data that is destined for the second memory location of the second main memory; and
   in response to a determination that the store buffer contains existing updated data that is destined for the second memory location of the second main memory, merging the updated data with the existing updated data in the store buffer.

28. The first node of claim 26,
wherein the first node further comprises a set of update propagation instructions, which may be part of the set of program instructions pertaining to the particular thread of execution, or separate therefrom;
wherein the set of update propagation instructions, when executed by the first processor or another processor on the first node, would cause the first processor or another processor to:
   retrieve the updated data from the store buffer; and
   cause the updated data to be propagated to the second node and stored within the second memory location of the second main memory.

29. The first node of claim 26,
wherein the first node further comprises a first coprocessor;
wherein the first node further comprises a set of update propagation instructions, which may be part of the set of program instructions pertaining to the particular thread of execution, or separate therefrom;
wherein the set of update propagation instructions, when executed by the first processor or another processor on the first node, would cause the first processor or another processor to:
   retrieve the updated data from the store buffer; and
   provide one or more instructions to the first coprocessor to cause the first coprocessor to propagate the updated data to the second node and to cause the updated data to be stored in the second memory location of the second main memory of the second node; and
   wherein the first coprocessor is operable to respond to the one or more instructions by interacting with a second coprocessor on the second node to cause the updated data to be propagated to the second node and stored within the second memory location of the second main memory.

30. The first node of claim 26,
wherein the mapping also maps the one or more memory addresses in the second memory location in the second main memory of the second node to one or more memory addresses in a third memory location in a third main memory of a third node;
wherein the first node further comprises a set of update propagation instructions, which may be part of the set of program instructions pertaining to the particular thread of execution, or separate therefrom;
wherein the set of update propagation instructions, when executed by the first processor or another processor on the first node, would cause the first processor or another processor to:
   retrieve the updated data from the store buffer; and
   cause:
      the updated data to be propagated to the second node and stored within the second memory location of the second main memory; and
      based on the mapping, data currently stored in the third memory location of the third main memory of the third node to be invalidated.

31. The first node of claim 26,
wherein the mapping also maps the one or more memory addresses in the second memory location in the second main memory of the second node to one or more memory addresses in a third memory location in a third main memory of a third node;
wherein the first node further comprises a first coprocessor;
wherein the first node further comprises a set of update propagation instructions, which may be part of the set of program instructions pertaining to the particular thread of execution, or separate therefrom;
wherein the set of update propagation instructions, when executed by the first processor or another processor on the first node, would cause the first processor or another processor to:
   retrieve the updated data from the store buffer;
   cause the updated data to be propagated to the second node and stored within the second memory location of the second main memory; and
   based on the mapping, provide one or more instructions to the first coprocessor to cause the first coprocessor to cause data currently stored in the third memory location of the third main memory of the third node to be invalidated; and
wherein the first coprocessor is operable to respond to the one or more instructions by interacting with a second coprocessor on the third node to cause the data currently stored in the third memory location of the third main memory of the third node to be invalidated.

32. The first node of claim 26,
wherein the first node further comprises a set of update propagation instructions, which may be part of the set of program instructions pertaining to the particular thread of execution, or separate therefrom;
wherein the set of update propagation instructions, when executed by the first processor or another processor on the first node, would cause the first processor or another processor to:
   retrieve the updated data from the store buffer; and
   cause:
      a directory entry associated with the second memory location of the second main memory of the second node to be locked, wherein the directory entry is stored on the second node;
      the updated data to be propagated to the second node and stored within the second memory location of the second main memory; and
      the directory entry to be unlocked.

33. The first node of claim 26,
wherein the mapping also maps the one or more memory addresses in the second memory location in the second main memory of the second node to one or more memory addresses in a third memory location in a third main memory of a third node;
wherein the first node further comprises a set of update propagation instructions, which may be part of the set of program instructions pertaining to the particular thread of execution, or separate therefrom;

wherein the set of update propagation instructions, when executed by the first processor or another processor on the first node, would cause the first processor or another processor to:
  retrieve the updated data from the store buffer; and
  cause:
    a directory entry associated with the second memory location of the second main memory of the second node to be locked, wherein the directory entry is stored on the second node, and wherein information in the directory entry indicates that the third node is currently a valid sharer of the second memory location of the second main memory;
    the updated data to be propagated to the second node and stored within the second memory location of the second main memory;
    data currently stored in the third memory location of the third main memory of the third node to be invalidated;
    the information in the directory entry to be updated such that the information no longer indicates the third node as a valid sharer of the second memory location of the second main memory; and
    the directory entry to be unlocked.

34. The first node of claim 20,
wherein the trap handling instructions, when executed by the first processor, would further cause the first processor to:
  store the updated data into the first memory location of the first main memory; and
wherein the trap handling instructions, when executed by the first processor, would cause the first processor to cause the updated data to be propagated to the second node by causing the updated data to be propagated to the second node and stored within the second memory location of the second main memory.

35. The first node of claim 20,
wherein the trap handling instructions, when executed by the first processor, would further cause the first processor to:
  invalidate data currently stored in the first memory location of the first main memory; and
wherein the trap handling instructions, when executed by the first processor, would cause the first processor to cause the updated data to be propagated to the second node by causing the updated data to be propagated to the second node and stored within the second memory location of the second main memory.

36. The first node of claim 20 wherein executing the store instruction further comprises:
  determining whether the first memory location of the first main memory is writeable;
  in response to determining the first memory location is not writeable, causing the store instruction to trap.

37. In a distributed system comprising a first node and a second node, wherein the first node has a first main memory and the second node has a second main memory, wherein the first main memory and the second main memory comprise random access memory, a method performed by the second node, comprising:
  generating and storing, in the second main memory, a mapping that maps one or more memory addresses in a first memory location in the first main memory to one or more virtual memory addresses corresponding to a second memory location in the second main memory;
  executing, by a first processor on the second node, a store instruction to store updated data into the second memory location of the second main memory, wherein the store instruction is part of a set of program instructions pertaining to a particular thread of execution;
  causing the store instruction to trap, which causes the first processor to suspend execution of the set of program instructions and to begin execution of a set of trap handling instructions;
  executing, by the first processor, the set of trap handling instructions, wherein executing the set of trap handling instructions causes:
    based on the mapping, storing the updated data into the second memory location of the second main memory; and
  resuming, by the first processor, execution of the set of program instructions.

38. The method of claim 37, further comprising:
while executing the set of trap handling instructions, the first processor:
  causing data currently stored in the first memory location of the first main memory to be invalidated.

39. The method of claim 37, further comprising:
while executing the set of trap handling instructions, the first processor:
  prior to storing the updated data into the second memory location of the second main memory, accessing and locking a directory entry associated with the second memory location of the second main memory; and
  after storing the updated data into the second memory location of the second main memory, unlocking the directory entry.

40. The method of claim 37, further comprising:
while executing the set of trap handling instructions, the first processor:
  prior to storing the updated data into the second memory location of the second main memory, accessing and locking a directory entry associated with the second memory location of the second main memory, wherein information in the directory entry indicates that the first node is currently a valid sharer of the second memory location of the second main memory;
  causing data currently stored in the first memory location of the first main memory to be invalidated;
  updating the information in the directory entry such that the information no longer indicates the first node as being a valid sharer of the second memory location of the second main memory; and
  after storing the updated data into the second memory location of the second main memory, unlocking the directory entry.

41. The method of claim 37, further comprising:
while executing the set of trap handling instructions, the first processor:
  storing information into a buffer indicating that data in the second memory location of the second main memory has been updated;
a second processor retrieving the information from the buffer; and
the second processor causing data currently stored in the first memory location of the first main memory to be invalidated;
wherein the second processor may be the first processor or another processor on the second node.

42. The method of claim 37, further comprising:
while executing the set of trap handling instructions, the first processor:

storing information into a buffer indicating that data in the second memory location of the second main memory has been updated;

a second processor retrieving the information from the buffer;

the second processor accessing and locking a directory entry associated with the second memory location of the second main memory, wherein information in the directory entry indicates that the first node is currently a valid sharer of the second memory location of the second main memory;

the second processor causing data currently stored in the first memory location of the first main memory to be invalidated;

the second processor updating the information in the directory entry such that the information no longer indicates the first node as being a valid sharer of the second memory location of the second main memory; and the second processor unlocking the directory entry; wherein the second processor may be the first processor or another processor on the second node.

43. A second node for use in a distributed computing system comprising a first node and the second node, the second node comprising:

a second main memory, wherein the second main memory stores a mapping that maps one or more virtual memory addresses corresponding to a second memory location in the second main memory to one or more memory addresses in a first memory location in a first main memory on the first node, wherein the first main memory and the second main memory comprise random access memory;

a set of trap handling instructions; and one or more processors including a first processor, the first processor operable to execute a store instruction to store updated data into the second memory location of the second main memory, wherein the store instruction is part of a set of program instructions pertaining to a particular thread of execution, and wherein the first processor comprises circuitry operable to cause the store instruction to trap, which would cause the first processor to suspend execution of the set of program instructions and to begin execution of the set of trap handling instructions; and wherein the set of trap handling instructions, when executed by the first processor, would cause the first processor to:

store the updated data into the second memory location of the second main memory based on the mapping; and resume execution of the set of program instructions.

44. The second node of claim 43, wherein the trap handling instructions, when executed by the first processor, would further cause the first processor to:

cause data currently stored in the first memory location of the first main memory to be invalidated.

45. The second node of claim 43, wherein the trap handling instructions, when executed by the first processor, would further cause the first processor to:

prior to storing the updated data into the second memory location of the second main memory, access and lock a directory entry associated with the second memory location of the second main memory; and after storing the updated data into the second memory location of the second main memory, unlock the directory entry.

46. The second node of claim 43, wherein the trap handling instructions, when executed by the first processor, would further cause the first processor to:

prior to storing the updated data into the second memory location of the second main memory, access and lock a directory entry associated with the second memory location of the second main memory, wherein information in the directory entry indicates that the first node is currently a valid sharer of the second memory location of the second main memory;

cause data currently stored in the first memory location of the first main memory to be invalidated;

update the information in the directory entry such that the information no longer indicates the first node as being a valid sharer of the second memory location of the second main memory; and after storing the updated data into the second memory location of the second main memory, unlock the directory entry.

47. The second node of claim 43, wherein the second node further comprises a set of invalidation instructions, which may be part of the set of program instructions pertaining to the particular thread of execution, or separate therefrom;

wherein the trap handling instructions, when executed by the first processor, would further cause the first processor to:

store information into a buffer indicating that data in the second memory location of the second main memory has been updated; and wherein the set of invalidation instructions, when executed by the first processor or another processor on the second node, would cause the first processor or another processor to:

retrieve the information from the buffer; and cause data currently stored in the first memory location of the first main memory to be invalidated.

48. The second node of claim 43, wherein the second node further comprises a set of invalidation instructions, which may be part of the set of program instructions pertaining to the particular thread of execution, or separate therefrom;

wherein the trap handling instructions, when executed by the first processor, would further cause the first processor to:

store information into a buffer indicating that data in the second memory location of the second main memory has been updated; and wherein the set of invalidation instructions, when executed by the first processor or another processor on the second node, would cause the first processor or another processor to:

retrieve the information from the buffer;

access and lock a directory entry associated with the second memory location of the second main memory, wherein information in the directory entry indicates that the first node is currently a valid sharer of the second memory location of the second main memory;

cause data currently stored in the first memory location of the first main memory to be invalidated;

update the information in the directory entry such that the information no longer indicates the first node as being a valid sharer of the second memory location of the second main memory; and unlock the directory entry.

* * * * *